US012456782B2

(12) United States Patent
Fukushima et al.

(10) Patent No.: US 12,456,782 B2
(45) Date of Patent: Oct. 28, 2025

(54) CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Naoki Fukushima, Mie (JP); Osamu Nakayama, Mie (JP); Katsushi Miyazaki, Mie (JP); Tetsuya Fujita, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD, Osaka (JP)

( * ) Notice: Subject to any disclaimer, the term of this patent is extended or adjusted under 35 U.S.C. 154(b) by 931 days.

(21) Appl. No.: 17/621,988

(22) PCT Filed: Jun. 18, 2020

(86) PCT No.: PCT/JP2020/024024
§ 371 (c)(1),
(2) Date: Dec. 22, 2021

(87) PCT Pub. No.: WO2021/006000
PCT Pub. Date: Jan. 14, 2021

(65) Prior Publication Data
US 2022/0263202 A1  Aug. 18, 2022

(30) Foreign Application Priority Data
Jul. 5, 2019 (JP) .................. 2019-125913

(51) Int. Cl.
*H01M 50/505* (2021.01)
*H01M 50/503* (2021.01)
(Continued)

(52) U.S. Cl.
CPC ....... *H01M 50/505* (2021.01); *H01M 50/503* (2021.01); *H01M 50/507* (2021.01);
(Continued)

(58) Field of Classification Search
CPC ............ H01M 50/502; H01M 50/503; H01M 50/507; H01R 11/12
See application file for complete search history.

(56) References Cited

U.S. PATENT DOCUMENTS 6,328,604 B1 *  12/2001  Inoue ................. H01M 50/598
                                                 439/522
2016/0315359 A1 *  10/2016  Tyler ................. H01M 50/507
(Continued)

FOREIGN PATENT DOCUMENTS

JP  2017-098043  6/2017
JP  2018-041724  3/2018
(Continued)

OTHER PUBLICATIONS

International Search Report issued in International Bureau of WIPO Patent Application No. PCT/JP2020/024024, dated Sep. 8, 2020, along with an English translation thereof.

*Primary Examiner* — Jeremiah R Smith
(74) *Attorney, Agent, or Firm* — Greenblum & Bernstein, P.L.C.

(57) ABSTRACT

A connection module according to the present disclosure is a connection module 20 attached to a power storage element group 90 in which a plurality of power storage elements 91, each having an electrode terminal 93, are arranged, and includes a connection member, an insulation protector 50, a
(Continued)

wire, and a terminal. The connection member is connected to the electrode terminals 93. The insulation protector 50 is assembled with the power storage element group 90 in a state where the connection member and the wire are accommodated therein. The terminal is capable of being connected to the connection member in a state in which the terminal is connected to an end of the wire. The insulation protector 50 includes a terminal holding part 80. The terminal holding part 80 removably holds the terminal in a state before the terminal is connected to the connection member.

5 Claims, 17 Drawing Sheets

(51) Int. Cl.
  *H01M 50/507*   (2021.01)
  *H01M 50/502*   (2021.01)
  *H01R 4/18*     (2006.01)
  *H01R 11/12*    (2006.01)

(52) U.S. Cl.
  CPC ...... *H01M 50/502* (2021.01); *H01M 2220/20* (2013.01); *H01R 4/184* (2013.01); *H01R 11/12* (2013.01)

(56) References Cited

U.S. PATENT DOCUMENTS

| | | | |
|---|---|---|---|
| 2018/0006288 A1 | 1/2018 | Nakayama et al. | |
| 2018/0069282 A1* | 3/2018 | Mastrandrea | H01M 50/507 |
| 2018/0205062 A1* | 7/2018 | Nakayama | H01M 50/505 |
| 2018/0315975 A1* | 11/2018 | Nakayama | H01M 50/522 |
| 2020/0075916 A1* | 3/2020 | Mori | H01M 50/519 |

FOREIGN PATENT DOCUMENTS

| | | | |
|---|---|---|---|
| WO | 2016/117419 | 7/2016 | |
| WO | WO-2017073319 A1 * | 5/2017 | H01M 2/1077 |

* cited by examiner

CONNECTION MODULE

TECHNICAL FIELD

The present disclosure relates to a connection module.

BACKGROUND ART

For example, a busbar module that is attached to a battery assembly constituted by a plurality of batteries is known, as described in JP 2018-41724A ("Patent Document 1" hereinafter).

The busbar module includes busbars connected to the electrodes of adjacent batteries, and terminals connected to the electrodes along with the busbars. The terminals are connected to a voltage sensing device by voltage sensing lines, and the voltage of each battery is sensed by the voltage sensing device.

CITATION LIST

Patent Documents

Patent Document 1: JP 2018-41724A

SUMMARY OF INVENTION

Technical Problem

Incidentally, if the terminals of the voltage sensing lines are connected to the busbars when connecting the busbar module to an external device, the terminals of the voltage sensing lines can move freely while attached to the ends of the voltage sensing lines until the terminals are connected to the busbar. For this reason, there is concern that the terminals may interfere with other components and the like.

The present specification discloses a technique for preventing terminals from interfering with other components and the like.

Solution to Problem

A connection module according to the present disclosure is a connection module that is attached to a power storage element group in which a plurality of power storage elements, each having an electrode terminal, are arranged. The connection module includes a connection member, an insulation protector, a wire, and a terminal. The connection member is connected to the electrode terminals. The insulation protector is assembled with the power storage element group in a state where the connection member and the wire are accommodated in the insulation protector. The terminal is capable of being connected to the connection member in a state in which the terminal is connected to an end of the wire. The insulation protector includes a terminal holding part. The terminal holding part removably holds the terminal in a state before the terminal is connected to the connection member.

Advantageous Effects of Invention

According to the present disclosure, terminals can be prevented from interfering with other components and the like.

DESCRIPTION OF EMBODIMENTS

Figure 1:
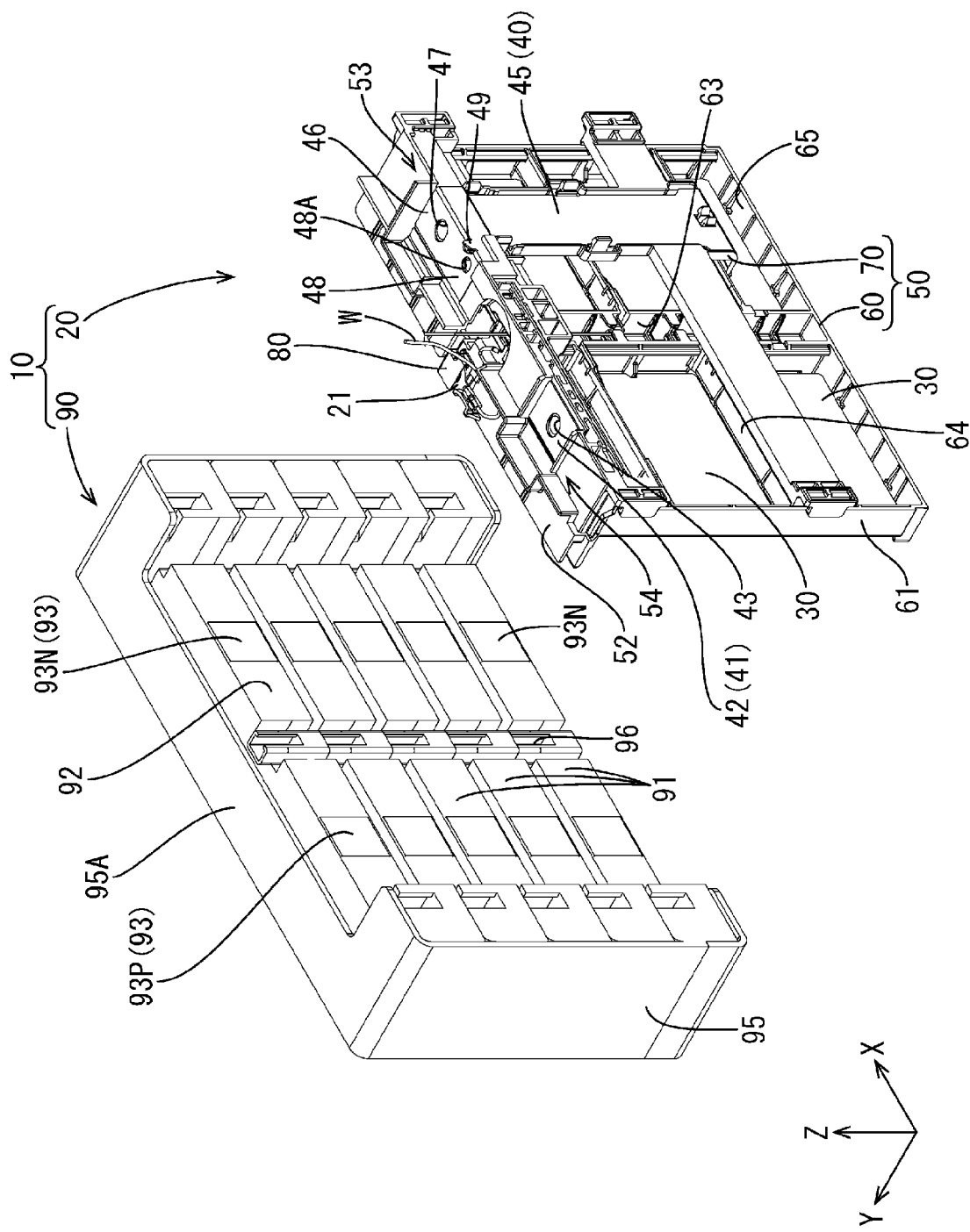
FIG. 1 is an exploded perspective view of a power storage module according to a first embodiment.

Description of Embodiments of the Present Disclosure

First, embodiments of the present disclosure will be described as examples.

(1) A connection module that is attached to a power storage element group in which a plurality of power storage elements, each having an electrode terminal, are arranged, the connection module including: a connection member, an insulation protector, a wire, and a terminal, wherein the connection member is connected to the electrode terminals, the insulation protector is assembled with the power storage element group in a state where the connection member and the wire are accommodated in the insulation protector, the terminal is capable of being connected to the connection member in a state in which the terminal is connected to an end of the wire, the insulation protector includes a terminal holding part, and the terminal holding part removably holds the terminal in a state before the terminal is connected to the connection member.

The terminal can be held by the holding part until the terminal is connected to the connection member, which makes it possible to prevent the terminal from interfering with other members and the like.

(2) The power storage element group includes an electrode disposition surface on which the electrode terminals are disposed and a battery side wall disposed intersecting with the electrode disposition surface; the connection member includes a member connection part connected to an external device; the insulation protector is disposed along the battery side wall and includes a busbar installation wall on which the member connection part is disposed; the terminal holding part is formed integrally with the busbar installation wall; and the terminal is connected to a terminal connection part that is continuous with the member connection part.

The terminal connection part is continuous with the member connection part, and thus the terminal connection part and the terminal can be connected in conjunction with the connecting of the external device to the member connection part. Additionally, because the terminal connection part, which is continuous with the member connection part, and the terminal holding part are disposed on the busbar installation wall, and thus the terminal can be connected to the terminal connection part with ease, as compared to a case where, for example, the terminal connection part and the terminal holding part are provided in different wall parts. Furthermore, the terminal holding part and the busbar installation wall are formed integrally, and thus an increase in the number of components can be suppressed as compared to a case where a separate holding part is attached to the busbar installation wall.

(3) The terminal includes a busbar connection part that makes surface contact with the connection member; the terminal holding part includes a holding wall and an elastic retaining piece; the holding wall is provided protruding toward the busbar installation wall; the elastic retaining piece is provided in the busbar installation wall so as to be capable of elastic displacement; and the holding wall and the elastic retaining piece make contact with an outside surface of the busbar connection part and retain the terminal in the terminal holding part.

The holding wall and the elastic retaining piece make contact with the outside surface of the busbar connection part and hold the terminal in the terminal holding part, and thus the part of the busbar connection part that makes surface contact with the connection member can be prevented from making contact with and damaging the holding wall, the elastic retaining piece, and the like. Additionally, the elastic retaining piece elastically displaces when the terminal is attached to and removed from the terminal holding part, which provides excellent ease of attachment and removal.

(4) The terminal holding part includes a protective wall that covers the terminal.

The terminal is held by the terminal holding part while being covered by the protective wall, which makes it possible to prevent other members from coming into contact or the like with the terminal and damaging the terminal.

(5) The elastic retaining piece is capable of elastic displacement by a slit being formed between the busbar installation wall and the elastic retaining piece, and the slit is curved in a plate thickness direction of the busbar connection part.

When the elastic retaining piece is capable of elastic displacement by providing the slit between the busbar installation wall and the elastic retaining piece, when the terminal is attached to and removed from the terminal holding part, there is a concern that the busbar connection part may enter into the slit and the terminal will be "bitten".

However, according to this configuration, the slit is curved in the plate thickness direction of the busbar connection part, and thus situations where the busbar connection part enters into the slit can be suppressed.

(6) The elastic retaining piece is curved along the terminal.

When the terminal is assembled with the terminal holding part, the terminal is guided by the curved elastic retaining piece. This makes it possible to improve the ease of assembly when assembling the terminal with the terminal holding part.

(7) The terminal includes a wire connection part that is crimped to the wire; the wire connection part protrudes in the plate thickness direction further than the busbar connection part; the busbar installation wall includes an escape part; and the escape part is offset in the opposite direction from the wire connection part by an amount greater than a dimension at which the wire connection part protrudes from the busbar connection part, with a position where the busbar connection part is disposed as a reference position.

When the terminal is attached to the terminal holding part in a state in which the wire connection part protrudes toward the busbar installation wall, the wire connection part is contained within the escape part, which is offset in the direction opposite from the wire connection part. This makes it possible to prevent interference between the terminal and the side wall. In other words, the terminal can be attached to the holding part without needing to be aware of the front and back of the terminal, which makes it possible to improve the ease of attachment of the terminal.

Details of Embodiment of Present Disclosure

Specific examples of the connection module and power storage module of the present disclosure will be described hereinafter with reference to the drawings. Note that the present disclosure is not intended to be limited to these examples, and is defined instead by the scope of the appended claims. All changes that fall within the same essential spirit and scope as the scope of the claims are intended to be included therein as well.

First Embodiment

A first embodiment of the present disclosure will be described with reference to FIG. 1 through FIG. 12.

The present embodiment describes, as an example, a power storage module 10 that is installed in a vehicle, e.g., an electric automobile, a hybrid automobile, or the like, and used as a power source to drive the vehicle. In the following descriptions, it is assumed that the direction indicated by the arrow line Z is up, the direction indicated by the arrow line Y is the rear, and the direction indicated by the arrow line X is the right. Additionally, when there are a plurality of identical members, only one of the members may be marked with a reference numeral, with the reference numeral omitted for the other identical members.

Power Storage Module 10

As illustrated in FIG. 1, the power storage module 10 is configured including a power storage element group 90, constituted by a plurality of power storage elements 91 arranged in a row, and a connection module 20 that is attached to a front part of the power storage element group 90.

Power Storage Element Group 90

The power storage element group 90 includes a plurality of power storage elements 91 arranged in the up-down direction and a frame 95 that accommodates the plurality of power storage elements 91 arranged in the up-down direction, as illustrated in FIG. 1.

Each power storage element 91 is, for example, a secondary battery. A front surface of each power storage element 91 serves as an electrode disposition surface 92 where a pair of electrode terminals 93 are disposed. The pair of electrode terminals 93 are disposed in positions of the electrode disposition surface 92 near left and right end parts thereof. One of the pair of electrode terminals 93 is designated as a positive terminal 93P, and the other as a negative terminal 93N. The power storage elements 91 are accommodated in the frame 95 such that the polarities of the adjacent electrode terminals 93 of two thereof adjacent to each other in the up-down direction are different, as illustrated in FIG. 1.

An engaged part 96, with which an engagement part (not shown) provided in the connection module 20 fits, is provided between the pair of electrode terminals 93 on the electrode disposition surface 92. The connection module 20 is held and secured to a front part of the power storage element group 90 by the engagement part fitting with the engaged part 96 and the engagement part and engaged part 96 engaging in a front-back direction.

The frame 95 is formed in what is a substantially rectangular shape in front view by four battery side walls 95A connected together. When the plurality of power storage elements 91 are accommodated within the frame 95, the battery side walls 95A are disposed so as to intersect orthogonally with the electrode disposition surface 92 of each power storage element 91. Although the battery side walls 95A are orthogonal to the electrode disposition surface 92 of each power storage element 91 in the present embodiment, the battery side walls may be arranged at an angle with respect to the electrode disposition surface.

Connection Module 20

Figure 2:
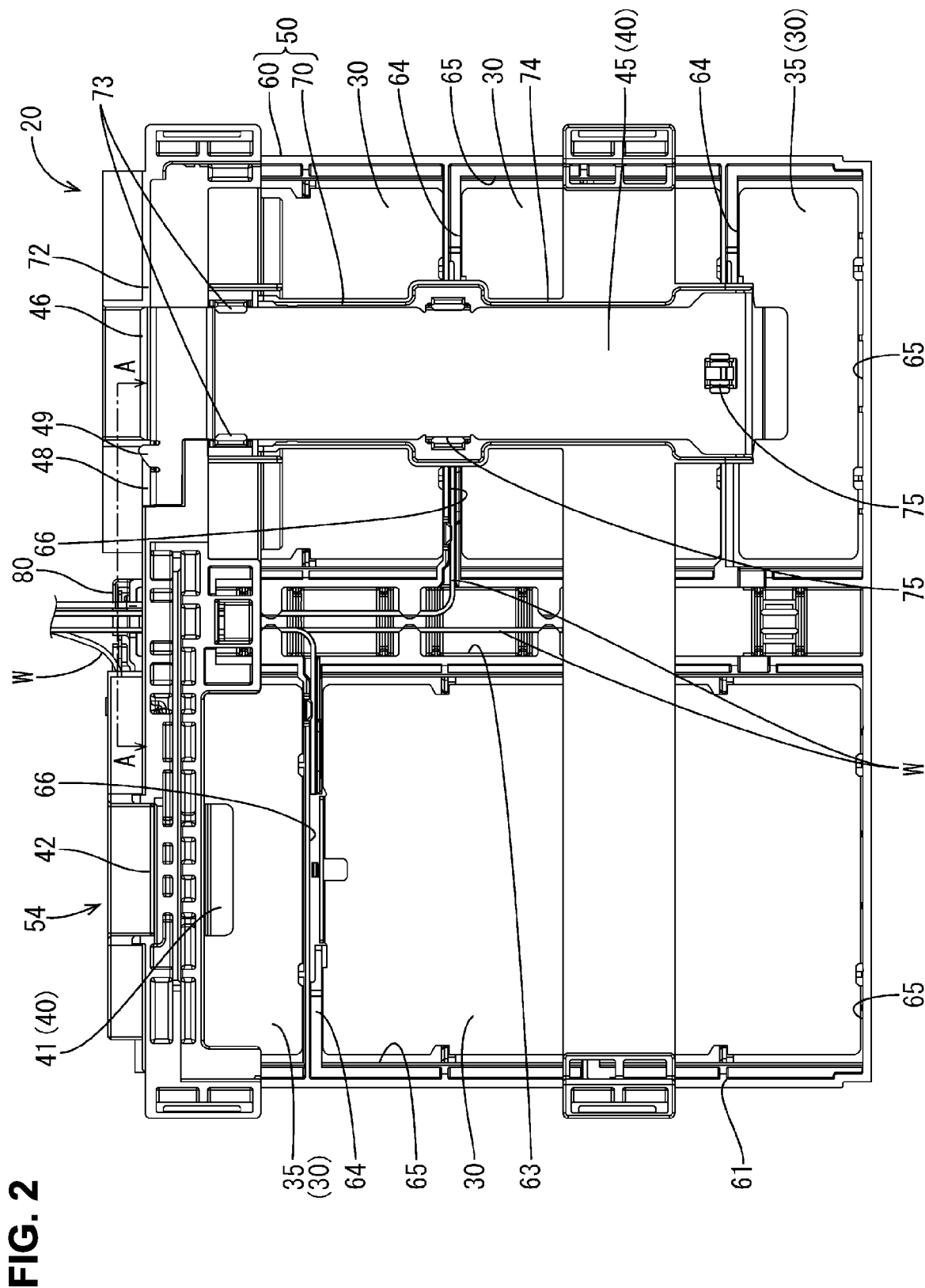
FIG. 2 is a front view of a connection module.
Figure 3:
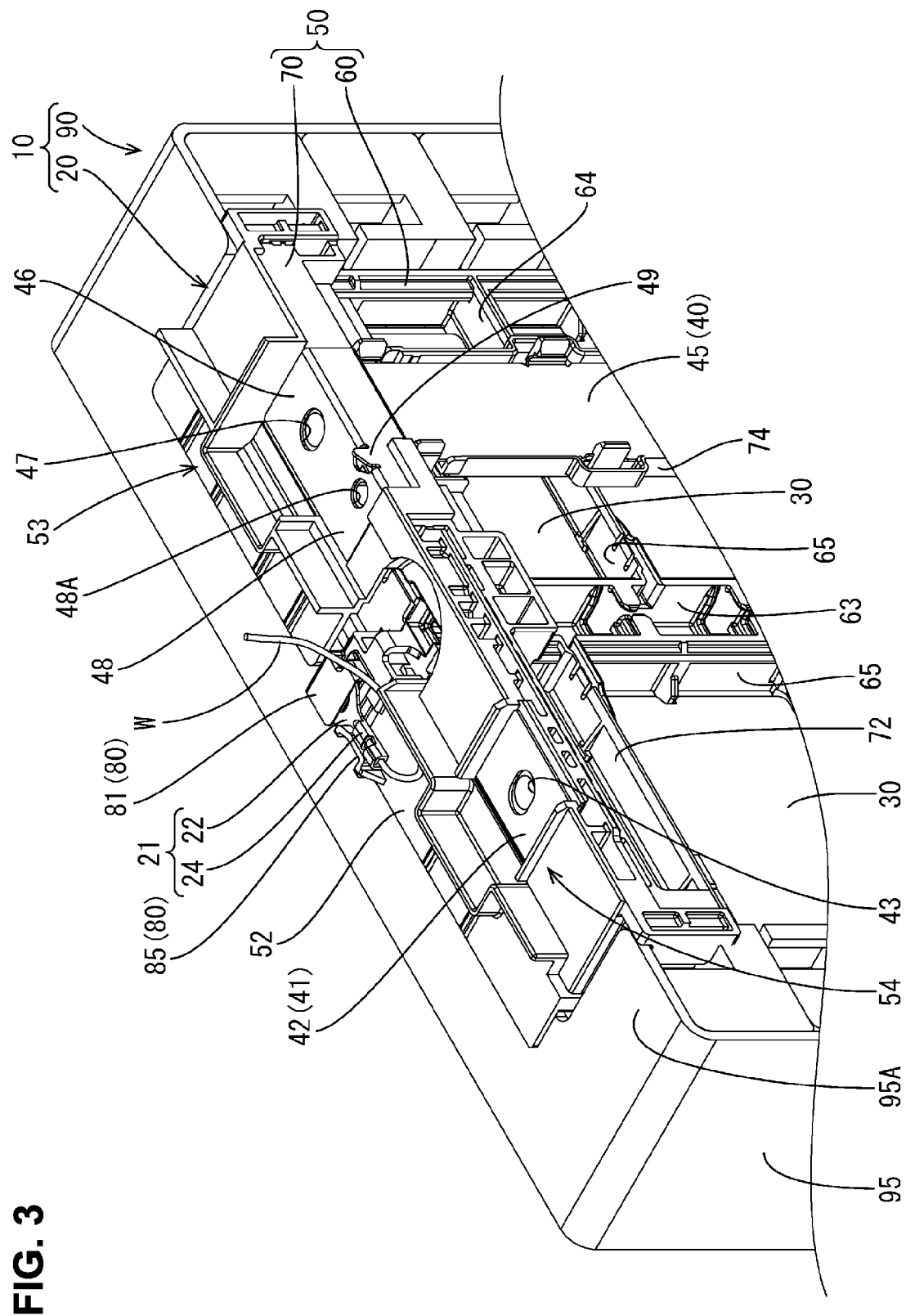
FIG. 3 is a perspective view of an upper part of the power storage module.

As illustrated in FIG. 1 to FIG. 3, the connection module 20 includes: a plurality of busbars 30 connected to the electrode terminals 93; a pair of external connection busbars 40 connected to the busbars 30 and an external member (not shown); an insulation protector 50 that holds the plurality of busbars 30 and the pair of external connection busbars 40; a plurality of voltage sensing lines (an example of "wires") W; and a voltage sensing terminal (an example of a "terminal") 21. The busbars 30 and the external connection busbars 40 collectively correspond to a "connection member".

Busbars 30

As illustrated in FIG. 2, each busbar 30 is formed as a rectangular flat plate in front view, by processing a conductive metal plate material. The busbars 30 are disposed on front surfaces of the electrode terminals 93 so as to straddle electrode terminals 93 adjacent vertically, and are electrically connected to the electrode terminals 93 through welding or the like. In the present embodiment, power storage elements 91 adjacent vertically are connected in series by the busbars 30. Note that some of the power storage elements 91 in the power storage element group 90 may be connected in parallel by disposing the power storage elements 91 such that electrode terminals 93 having the same polarity are adjacent to each other.

Of the busbars 30, the busbars 30 disposed at a right-side lower end and a left-side upper end of the power storage element group 90 are end busbars 35. The end busbars 35 have length dimensions in the up-down direction large enough to cover a single electrode terminal 93. The end busbar 35 disposed on the left-side upper end is electrically connected to the positive terminal 93P disposed on the left-side upper end of the power storage element group 90 through welding or the like. The end busbar 35 disposed on the right-side lower end is electrically connected to the negative terminal 93N disposed on the right-side lower end of the power storage element group 90 through welding or the like.

External Connection Busbars 40

The pair of external connection busbars 40 are formed by processing a conductive metal plate material.

As illustrated in FIG. 1 to FIG. 3, of the pair of external connection busbars 40, one external connection busbar 40 is a positive electrode connection busbar 41 which is shorter in the front-back direction.

As illustrated in FIG. 2, the positive electrode connection busbar 41 is connected to the end busbar 35 disposed on the left-side upper end of the power storage element group 90. The positive electrode connection busbar 41 is formed extending upward from the end busbars 35 disposed on the left-side upper end. The positive electrode connection busbar 41 has a positive electrode member connection part 42, which is rectangular in plan view, disposed along an upper surface of a busbar installation wall (upper wall) 52 of the insulation protector 50 (described later).

A device-side terminal (not shown) provided in an external device is mounted on and connected to the positive electrode member connection part 42.

A bolt insertion hole 43, into which a fastening bolt (not shown) can be inserted, is formed in the positive electrode member connection part 42, penetrating therethrough in the up-down direction. A nut (not shown) held by the insulation protector 50 is disposed below the positive electrode member connection part 42. The device-side terminal mounted on the positive electrode member connection part 42 and the fastening bolt inserted into the bolt insertion hole 43 are tightened by the nut. The device-side terminal and the positive electrode member connection part 42 are electrically connected as a result.

As illustrated in FIG. 1 to FIG. 3, a negative electrode connection busbar 45 is connected to the end busbar 35 disposed on the right-side lower end of the power storage element group 90. The negative electrode connection busbar 45 is formed extending from the end busbar 35 disposed on the right-side lower end to the busbar installation wall (upper wall). The negative electrode connection busbar 45 has a negative electrode member connection part (an example of a "member connection part") 46, which is rectangular in plan view, disposed along the upper surface of the busbar installation wall (upper wall) 52 of the insulation protector 50.

A device-side terminal (not shown) provided in the external device is mounted on and connected to the negative electrode member connection part 46.

A bolt insertion hole 47, into which a fastening bolt (not shown) can be inserted, is formed in the negative electrode member connection part 46, penetrating therethrough in the up-down direction. A nut (not shown) held by the insulation protector 50 is disposed below the negative electrode member connection part 46. The device-side terminal mounted on the negative electrode member connection part 46 and the fastening bolt inserted into the bolt insertion hole 47 are tightened by the nut. The device-side terminal and the negative electrode member connection part 46 are electrically connected as a result.

As illustrated in FIG. 3 to FIG. 6, the negative electrode member connection part 46 has a terminal connection part 48, which is rectangular in plan view, that is continuous with a left-side edge of the terminal connection part.

Figure 11:
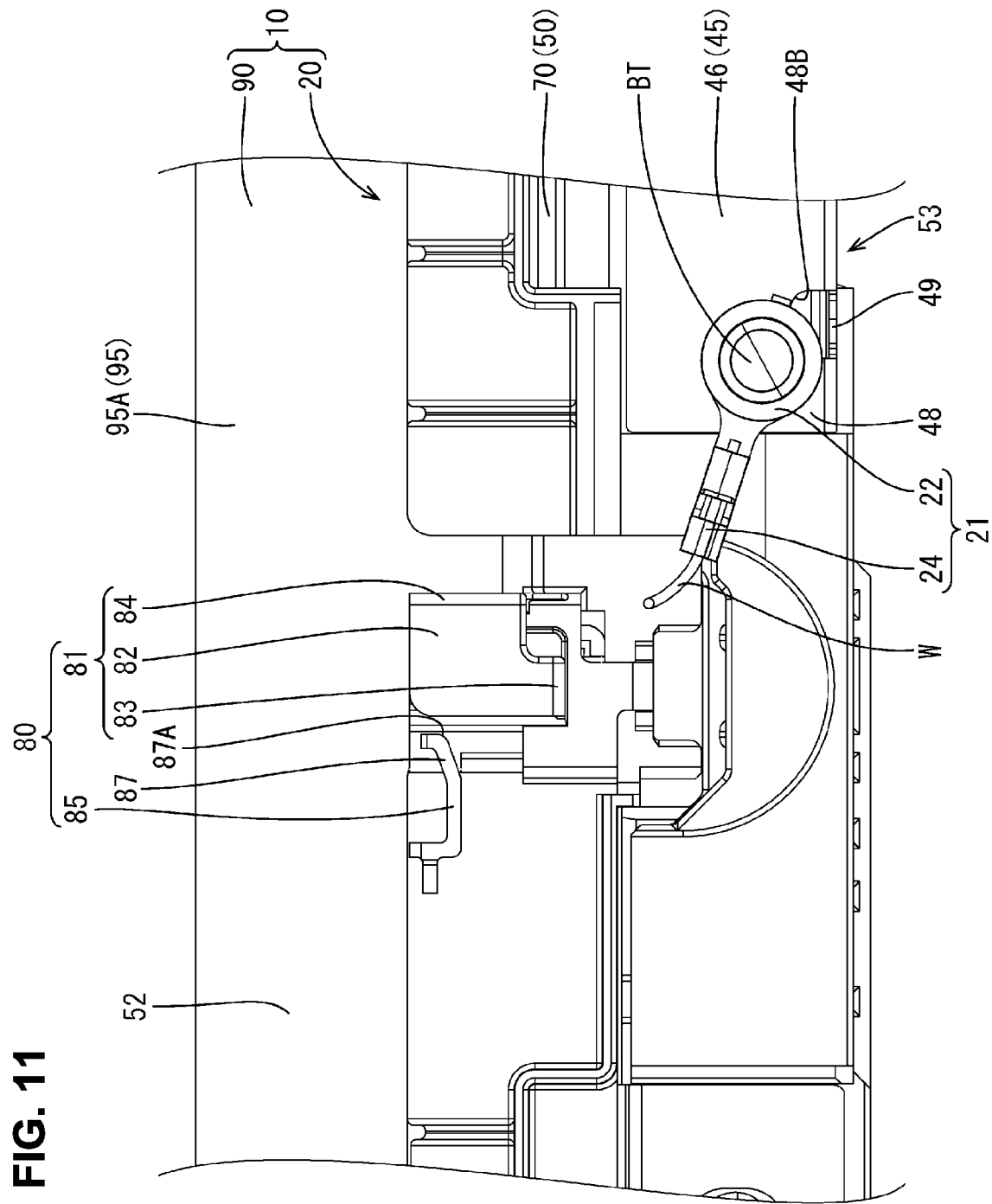
FIG. 11 is an enlarged plan view of primary elements, illustrating a state in which the voltage sensing terminal is connected to the terminal connection part using a fastening bolt.

As illustrated in FIG. 11, a voltage sensing terminal 21 (described later) is mounted on and connected to the terminal connection part 48. As illustrated in FIG. 3 to FIG. 6, a bolt insertion hole 48A, into which a fastening bolt BT can be inserted, is formed in the terminal connection part 48, penetrating therethrough in the up-down direction. A nut (not shown) held by the insulation protector 50 is disposed below the terminal connection part 48. The voltage sensing terminal 21 mounted on the terminal connection part 48 and the fastening bolt BT inserted into the bolt insertion hole 47 are tightened by the nut. The voltage sensing terminal 21 and the terminal connection part 48 are electrically connected as a result.

Figure 12:
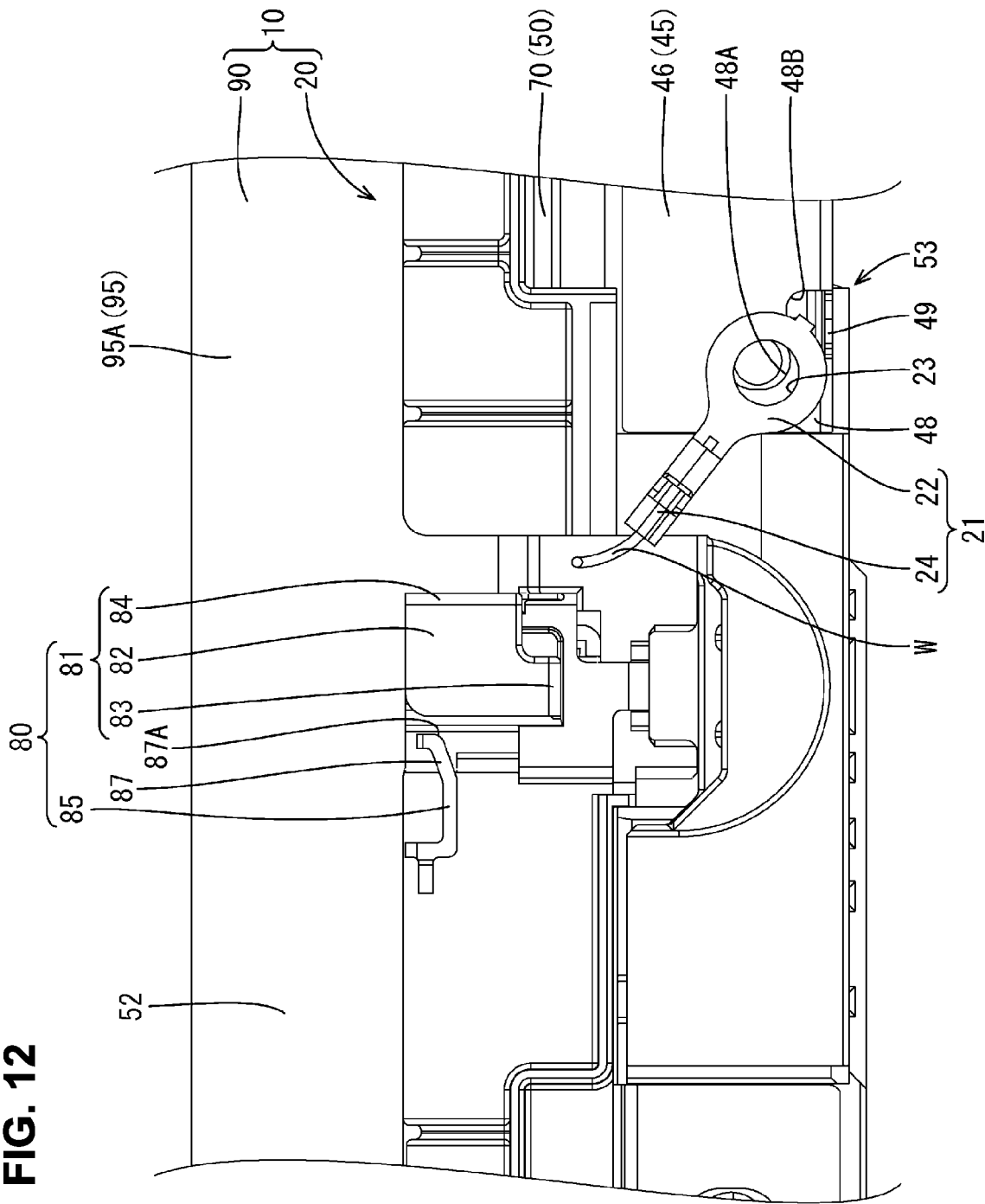
FIG. 12 is an enlarged plan view illustrating primary elements, illustrating a state in which the voltage sensing terminal is stopped in front by a front stop part.

As illustrated in FIG. 12, a front stop part 49 that stops the voltage sensing terminal 21 in front is formed in a front edge of the terminal connection part 48.

As illustrated in FIG. 3 to FIG. 6, the front stop part 49 is formed extending upward, diagonally to the front of the bolt insertion hole 47. The front stop part 49 is formed extending upward by forming a cutout in a position between the position of the front edge of the terminal connection part 48 and the bolt insertion hole 47 and forming the terminal connection part 48 in a curved manner.

An edge of the front stop part 49, on the side closer to the bolt insertion hole 47, is sloped along the bolt insertion hole 47. In other words, a notch 48B that follows the bolt insertion hole 47 is formed between the front edge of the terminal connection part 48 and the bolt insertion hole 47, and a decrease in the area of contact between the voltage sensing terminal 21 and the terminal connection part 48 when the voltage sensing terminal 21 is connected to the terminal connection part 48 can therefore be suppressed.

Voltage Sensing Line W

The voltage sensing line W is a coated wire having a core wire coated in an insulative coating. As illustrated in FIG. 2 and FIG. 11, a plurality of the voltage sensing lines W are connected at one end to each of the busbars 30 or the external connection busbars 40 and at the other end to an electronic control unit (not shown). The voltage sensing lines W convey voltages of the corresponding power storage elements 91 and the power storage element group 90 to the electronic control unit via the busbars 30 or the external connection busbars 40. In each voltage sensing line W connected to the busbars 30, the core wire exposed at one end of the voltage sensing line W is connected to a wire connection part (not shown) provided in the busbar 30 through welding or the like. Each of the voltage sensing lines W to be connected to the external connection busbars 40 is connected to the external connection busbar 40 via the voltage sensing terminal 21 to which one end of the voltage sensing line W is connected.

Voltage Sensing Terminal 21

The voltage sensing terminal 21 is formed by processing a conductive metal plate material. As illustrated in FIG. 4 to FIG. 8, the voltage sensing terminal 21 includes a rounded, plate-shaped busbar connection part 22, and a wire connection part 24 to which the voltage sensing line W is connected.

The busbar connection part 22 is connected to the terminal connection part 48 of the negative electrode connection busbar 45 so as to be in surface contact therewith. The busbar connection part 22 has a round through-hole 23 into which the fastening bolt BT is inserted. The busbar connection part 22 makes surface contact with, and is electrically connected to, the terminal connection part 48 by the fastening bolt BT inserted into the through-hole 23 being inserted into the bolt insertion hole 47 of the terminal connection part 48 and tightened with a nut.

The wire connection part 24 has a longer, thinner shape than the busbar connection part 22. Accordingly, the voltage sensing terminal 21 is configured such that the busbar connection part 22 is the widest part.

The wire connection part 24 has a bottom plate 24A which is continuous with the busbar connection part 22, and a pair of barrel pieces 24B that are continuous with the bottom plate 24A.

The wire connection part 24 is electrically connected to the voltage sensing line W by disposing the exposed core wire at one end of the voltage sensing line W upon the bottom plate 24A and crimping the pair of barrel pieces 24B.

Accordingly, when connected to the voltage sensing line W, the wire connection part 24 projects further to one side in a plate thickness direction (upward, in FIG. 4 and FIG. 7) than the busbar connection part 22.

Insulation Protector 50

As illustrated in FIG. 1 and FIG. 2, the insulation protector 50 is configured including a first protector 60 that holds the plurality of busbars 30 and a second protector 70 that holds the pair of external connection busbars 40.

First Protector 60

The first protector 60 is formed from an insulative synthetic resin. The first protector 60 has a main protector body 61 having a rectangular frame shape in a front view. A plurality of busbar holding parts 65 are formed on an inner side of the main protector body 61 by a routing channel 63 extending in the up-down direction in a central part of the main protector body 61 in the left-right direction and partition walls 64 extending in the left-right direction from the routing channel 63.

As illustrated in FIG. 2, the plurality of busbar holding parts 65 are disposed with two in the left-right direction and three in the up-down direction, for a total of six. The busbar holding parts 65 divided in two in the left-right direction are shifted vertically by an amount equivalent to the size of a single power storage element 91, bordering the routing channel 63.

As such, when the electrode terminals 93 of adjacent power storage elements 91 are connected to each other by the busbar 30, the power storage elements 91 of the power storage element group 90 are connected in series.

The partition wall 64 disposed between the busbar holding parts 65 adjacent in the up-down direction is provided with a branch line channel 66 which guides the voltage sensing lines W connected to the busbars 30 to the routing channel 63. The voltage sensing lines W disposed in the branch line channel 66 are led out to the routing channel 63, and then led out toward the electronic control unit from above the main protector body 61 through the routing channel 63.

Second Protector 70

The second protector 70 is an insulative member made from a synthetic resin, and is formed as an entity separate from the first protector 60. As illustrated in FIG. 2, the second protector 70 includes a first busbar holding part 72, with which a front end of the negative electrode connection busbar 45 and the positive electrode connection busbar 41 are assembled, and a second busbar holding part 74, which holds the negative electrode connection busbar 45 extending rearward from a right side part of the first busbar holding part 72.

As illustrated in FIG. 2, the first busbar holding part 72 is longer in the left-right direction. The positive electrode connection busbar 41 is assembled and secured from below by a securing means (not shown), on the left side of what is substantially the center of the first busbar holding part 72 in the left-right direction.

On the other hand, the front end of the negative electrode connection busbar 45 is secured by a pair of engagement claws 73, on the right side of what is substantially the center of the first busbar holding part 72 in the left-right direction.

The first busbar holding part 72 is secured to the first protector 60 by left and right end parts of the first busbar holding part 72 in the engaging with left and right side parts of the first protector 60 in the up-down direction. When the first protector 60 and the second protector 70 are secured, the positive electrode connection busbar 41 assembled with the first busbar holding part 72 is disposed in front of the end busbar 35 disposed on a left-side upper end of the first protector 60. The positive electrode connection busbar 41 disposed in front of the end busbar 35 is electrically connected to the end busbar 35 through welding or the like.

As illustrated in FIG. 2, the second busbar holding part 74 extends rearward from a right-side rear end of the first busbar holding part 72, and has a rear end that extends in the left-right direction. The negative electrode connection busbar 45 is secured to the second busbar holding part 74 by a pair of engagement pieces 75 provided in the center of the front-back direction. On the other hand, the second busbar holding part 74 is secured to the first protector 60 by left and right end parts in the rear end engaging with left and right side parts of the first protector 60 in the up-down direction.

When the first protector 60 and the second protector 70 are secured, a lower end of the negative electrode connection busbar 45 assembled with the second busbar holding part 74 is disposed in front of the end busbar 35 disposed on the right-side lower end of the first protector 60. The negative electrode connection busbar 45 disposed in front of the end busbar 35 is electrically connected to the end busbar 35 through welding or the like.

Additionally, as illustrated in FIG. 1 and FIG. 3, when the first protector 60 and the second protector 70 are secured, the busbar installation wall 52, which is an upper wall of the insulation protector 50, is configured by an upper wall of the first protector 60 and the first busbar holding part 72 of the second protector 70.

In other words, the upper wall of the insulation protector 50 serves as the busbar installation wall 52, which is disposed above the battery side walls 95A on the upper side of the frame 95 in the power storage element group 90 in a state where the positive electrode member connection part 42 of the positive electrode connection busbar 41 and the negative electrode member connection part 46 of the negative electrode connection busbar 45 are mounted.

The right side of the busbar installation wall 52 from the center thereof in the left-right direction serves as a negative electrode busbar holding part 53 where the negative electrode member connection part 46 of the negative electrode connection busbar 45 and the terminal connection part 48 are disposed, and the left side of the busbar installation wall 52 from the center thereof in the left-right direction serves as a positive electrode busbar holding part 54 where the positive electrode member connection part 42 of the positive electrode connection busbar 41 is disposed.

As illustrated in FIG. 3 to FIG. 6, a terminal holding part 80, which holds the voltage sensing terminal 21 at a position to the rear of the positive electrode member connection part 42, the negative electrode member connection part 46, and the terminal connection part 48, is formed in a central part in the left-right direction of the busbar installation wall 52 constituted by the first protector 60. In other words, the terminal connection part 48 is disposed on the right-diagonal front of the terminal holding part 80.

Terminal Holding Part 80

Figure 4:
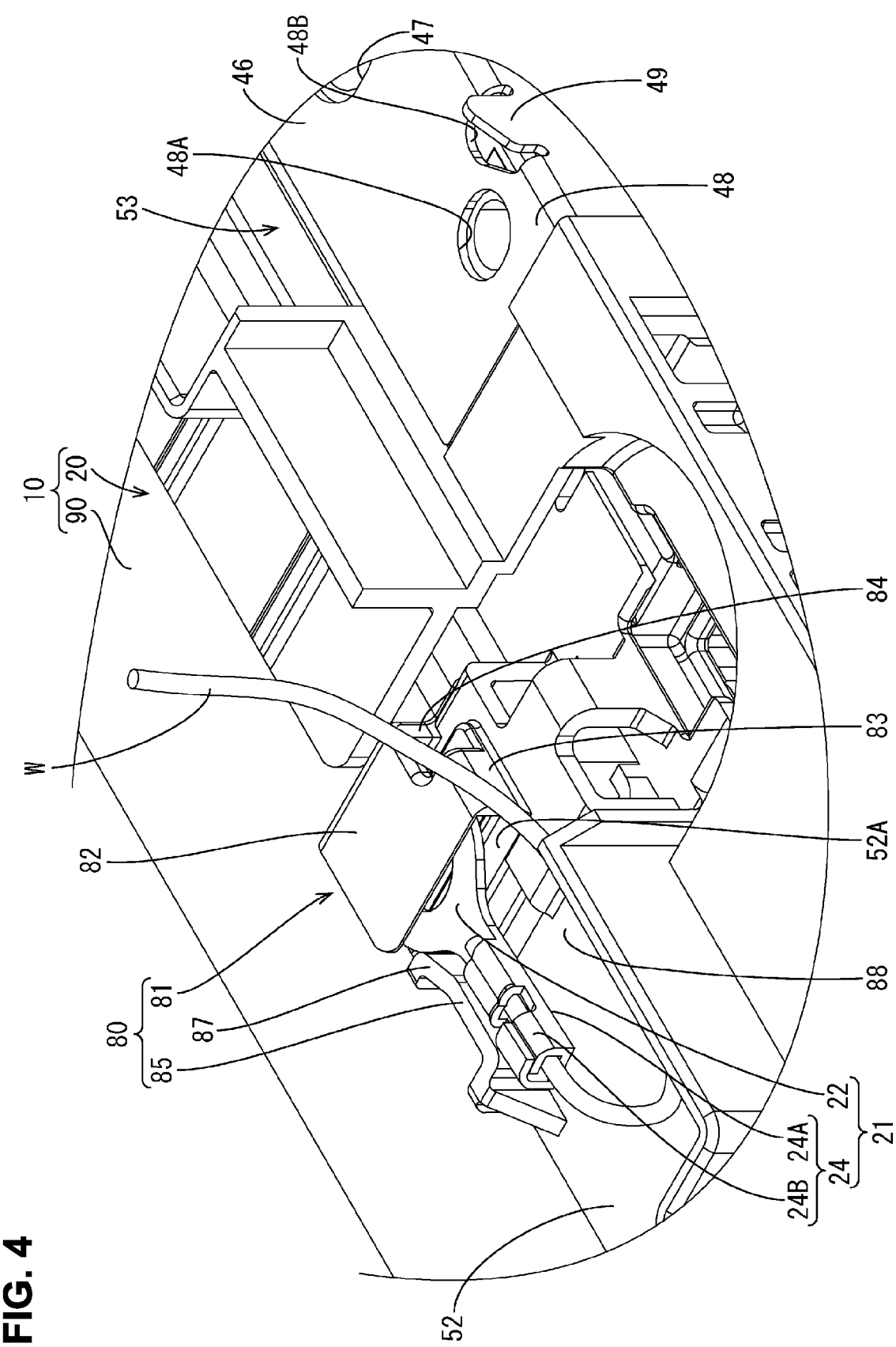
FIG. 4 is an enlarged perspective view illustrating primary elements of the power storage module.
Figure 5:
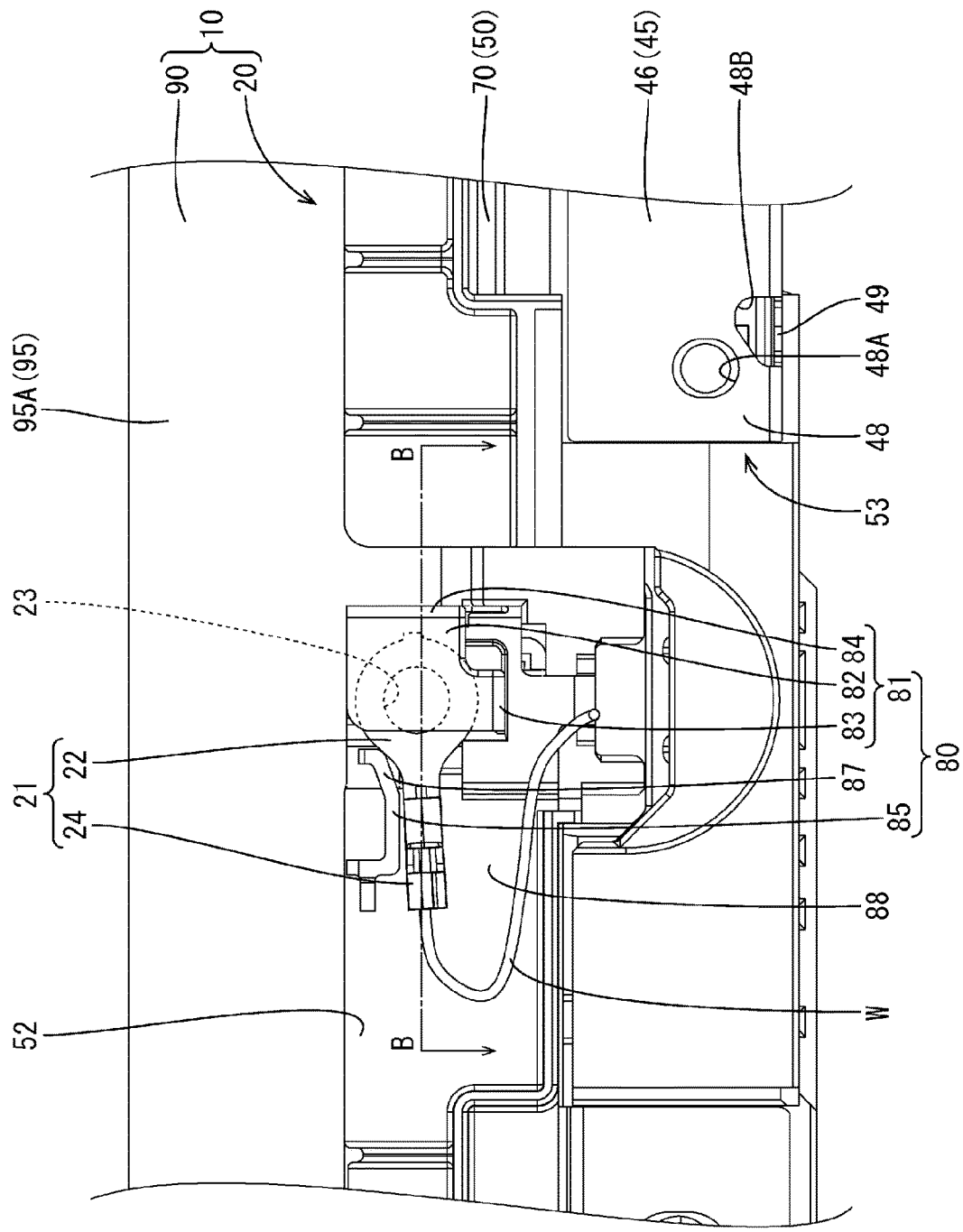
FIG. 5 is an enlarged plan view illustrating primary elements of the power storage module.
Figure 6:
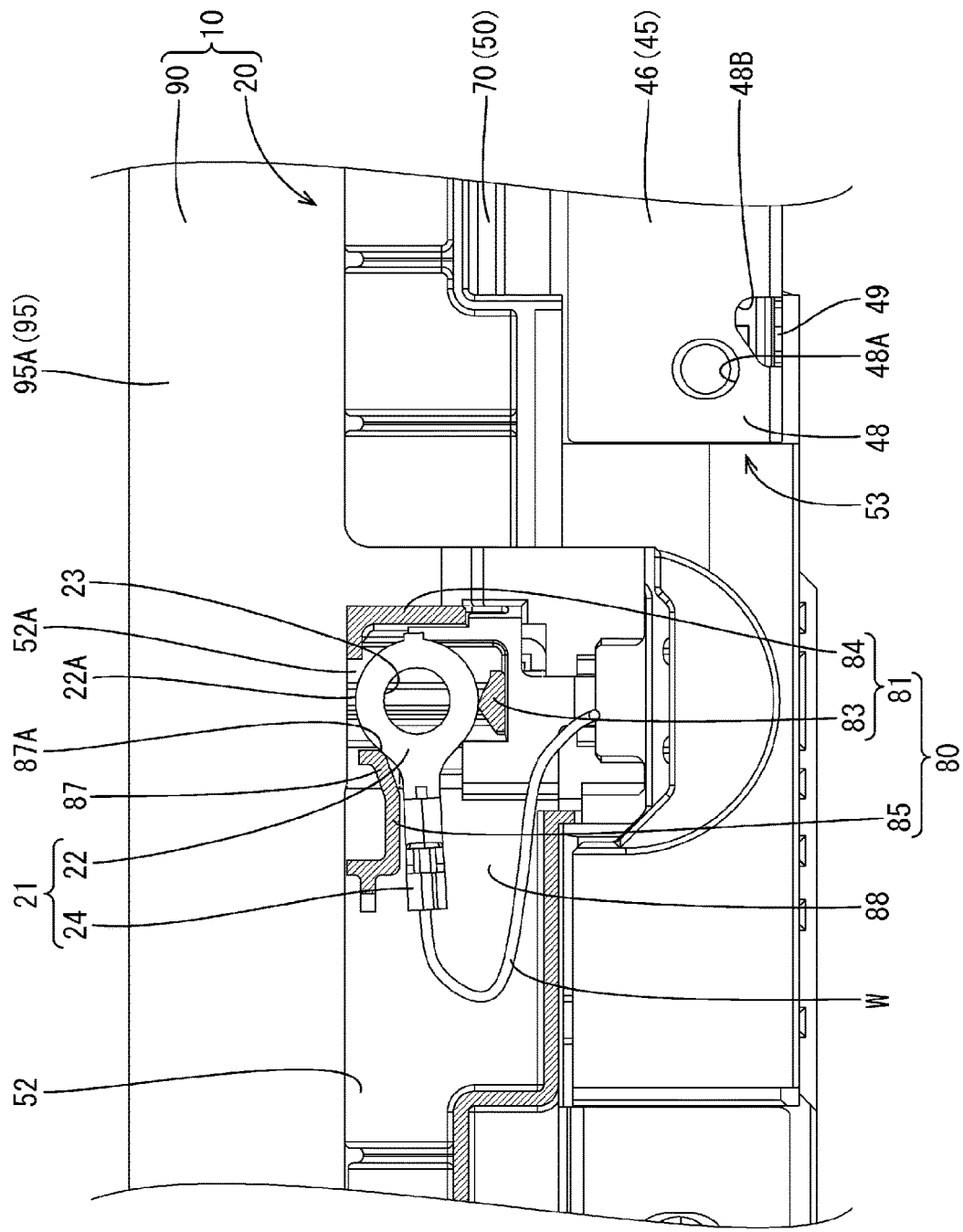
FIG. 6 is a cross-sectional view taken from a line A-A in FIG. 2.

As illustrated in FIG. 4 to FIG. 6, the terminal holding part 80 is configured such that the voltage sensing terminal 21 is assembled from the left, and includes a terminal accommodating part 81 in which the busbar connection part 22 of the voltage sensing terminal 21 is accommodated from the left, and an elastic retaining piece 85 provided on the left of the terminal accommodating part 81.

Terminal Accommodating Part 81

Figure 7:
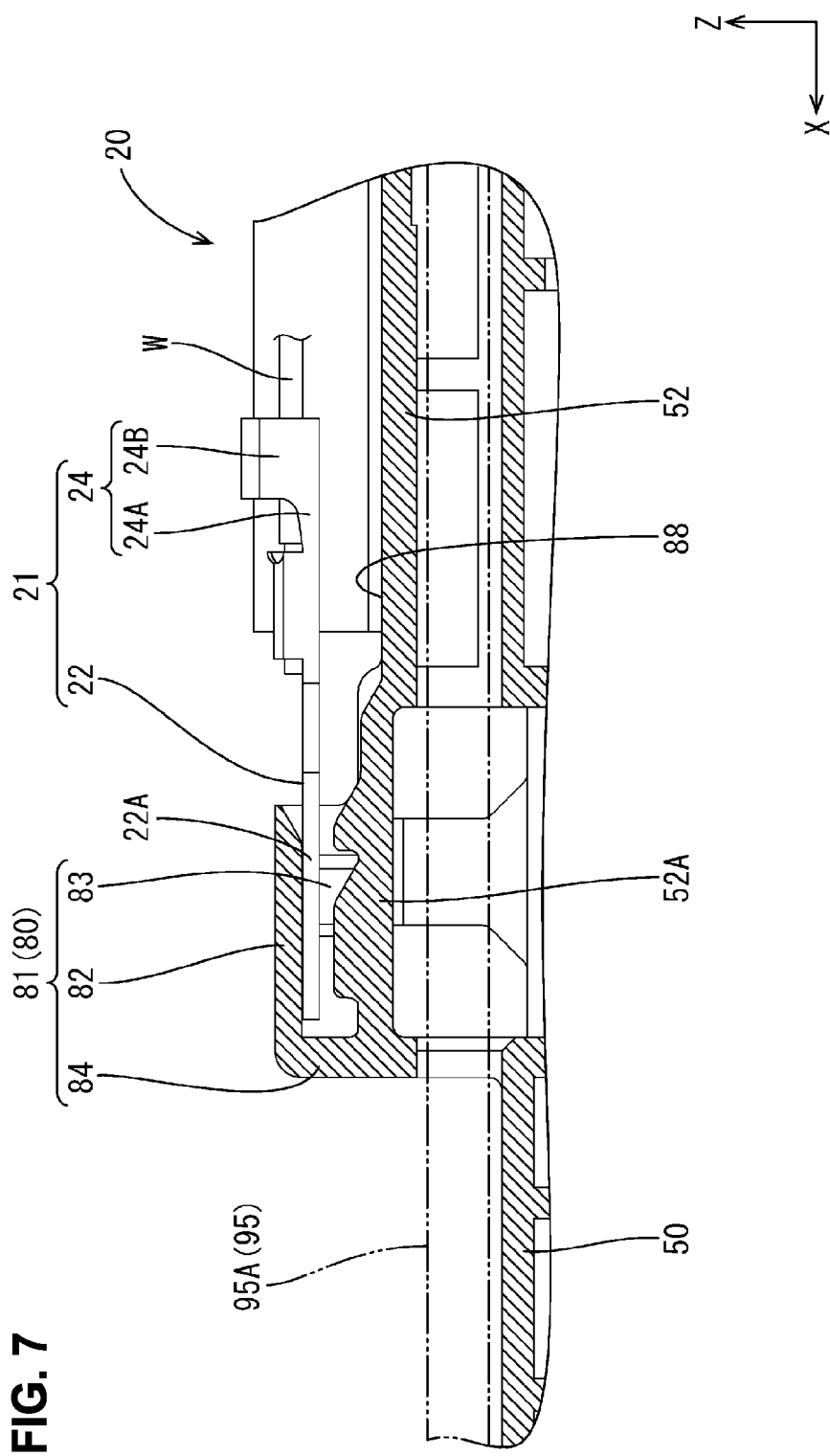
FIG. 7 is a cross-sectional view taken from a line B-B in FIG. 5.
Figure 8:
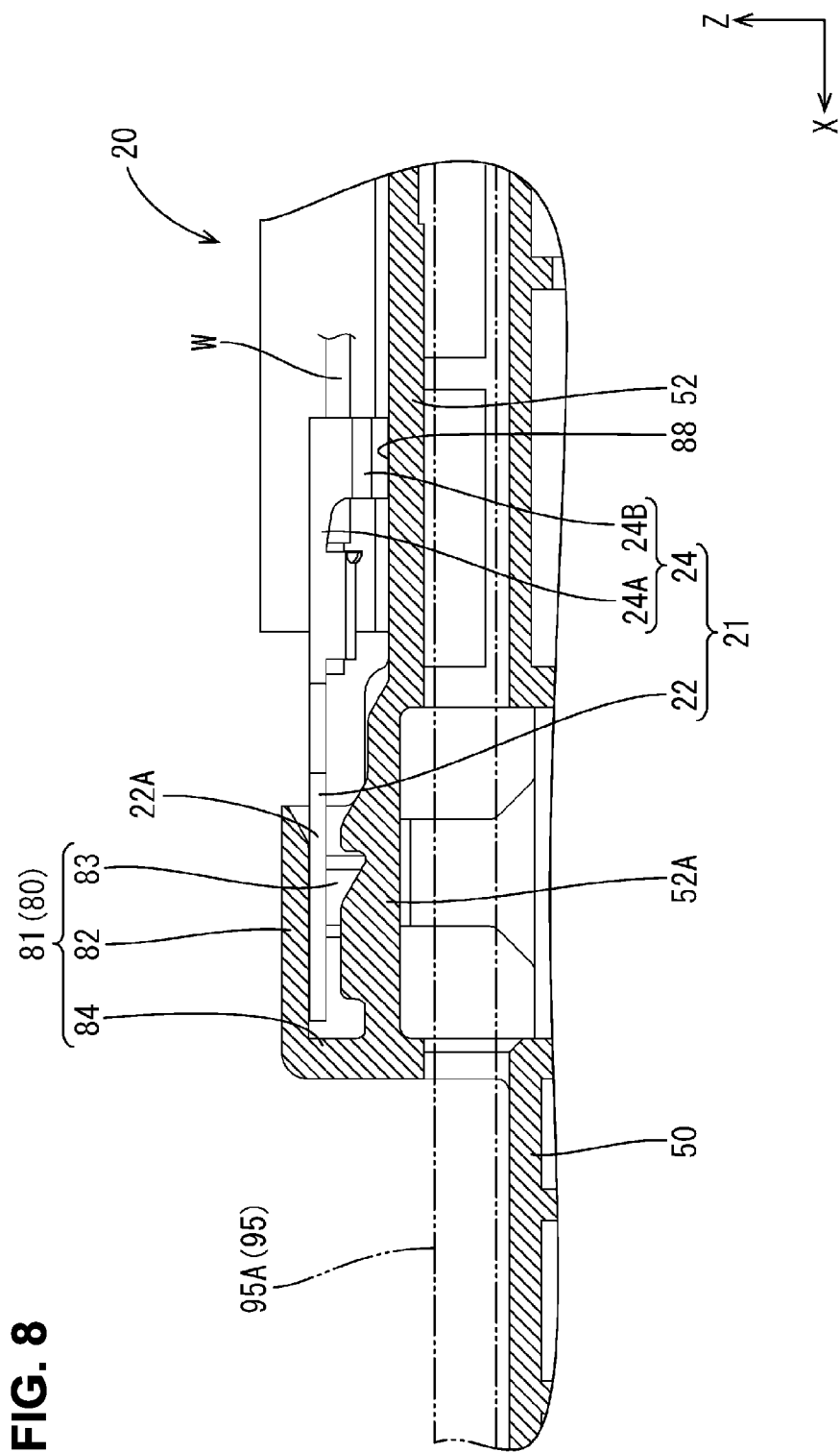
FIG. 8 is a cross-sectional view illustrating a state in which a voltage sensing terminal is held by a holding part having been inverted vertically, and is a cross-sectional view corresponding to the cross-section in FIG. 7.

The terminal accommodating part 81 is formed in a rectangular shape in a plan view, with a low profile in the up-down direction. As illustrated in FIG. 7 and FIG. 8, the busbar installation wall 52, which constitutes a lower surface of the terminal accommodating part 81, serves as a lower holding wall 52A, which is offset slightly upward from the rest of the busbar installation wall 52 so as to be distanced from the frame 95 of the power storage element group 90. The amount of offset of the lower holding wall 52A is set to be greater than the height dimension of the wire connection part 24 in the voltage sensing terminal 21. Accordingly, as illustrated in FIG. 8, a region on the left side of the terminal accommodating part 81 is such that when the voltage sensing terminal 21 is flipped upside-down and accommodated in the terminal accommodating part 81, the wire connection part 24 protruding downward does not interfere with the busbar installation wall 52.

In other words, the region on the left side of the terminal accommodating part 81 serves as an escape part 88, which is offset lower than the lower holding wall 52A of the terminal holding part 80 and which prevents interference between the wire connection part 24 protruding downward and the busbar installation wall 52 when the voltage sensing terminal 21 is flipped upside-down and accommodated in the terminal accommodating part 81.

The terminal accommodating part 81 includes a protective wall 82 that faces the lower holding wall 52A in the up-down direction, a front holding wall 83 that connects a front edge of the protective wall 82 to the lower holding wall 52A, and a right holding wall 84 that connects a right-side end of the protective wall 82 to the lower holding wall 52A.

The protective wall 82 is sized to cover the busbar connection part 22 of the voltage sensing terminal 21 from above. Specifically, the protective wall 82 is formed with a size such that when the busbar connection part 22 is disposed below, the protective wall 82 covers the busbar connection part 22 from above, with the exception of one part on the wire connection part 24 side.

As illustrated in FIG. 6, the front holding wall 83 is formed having a triangular cross-sectional shape protruding toward an inner side of the terminal accommodating part 81.

As illustrated in FIG. 6, the right holding wall 84 has a continuous form from the right-side rear end to the right-side edge of the protective wall 82.

The right-front end of the terminal accommodating part 81 is open toward the front, and the left-rear end is open toward the rear. The opening in the terminal accommodating part 81 on the right-front end is smaller than the outer diameter of the busbar connection part 22.

Elastic Retaining Piece 85

Figure 9:
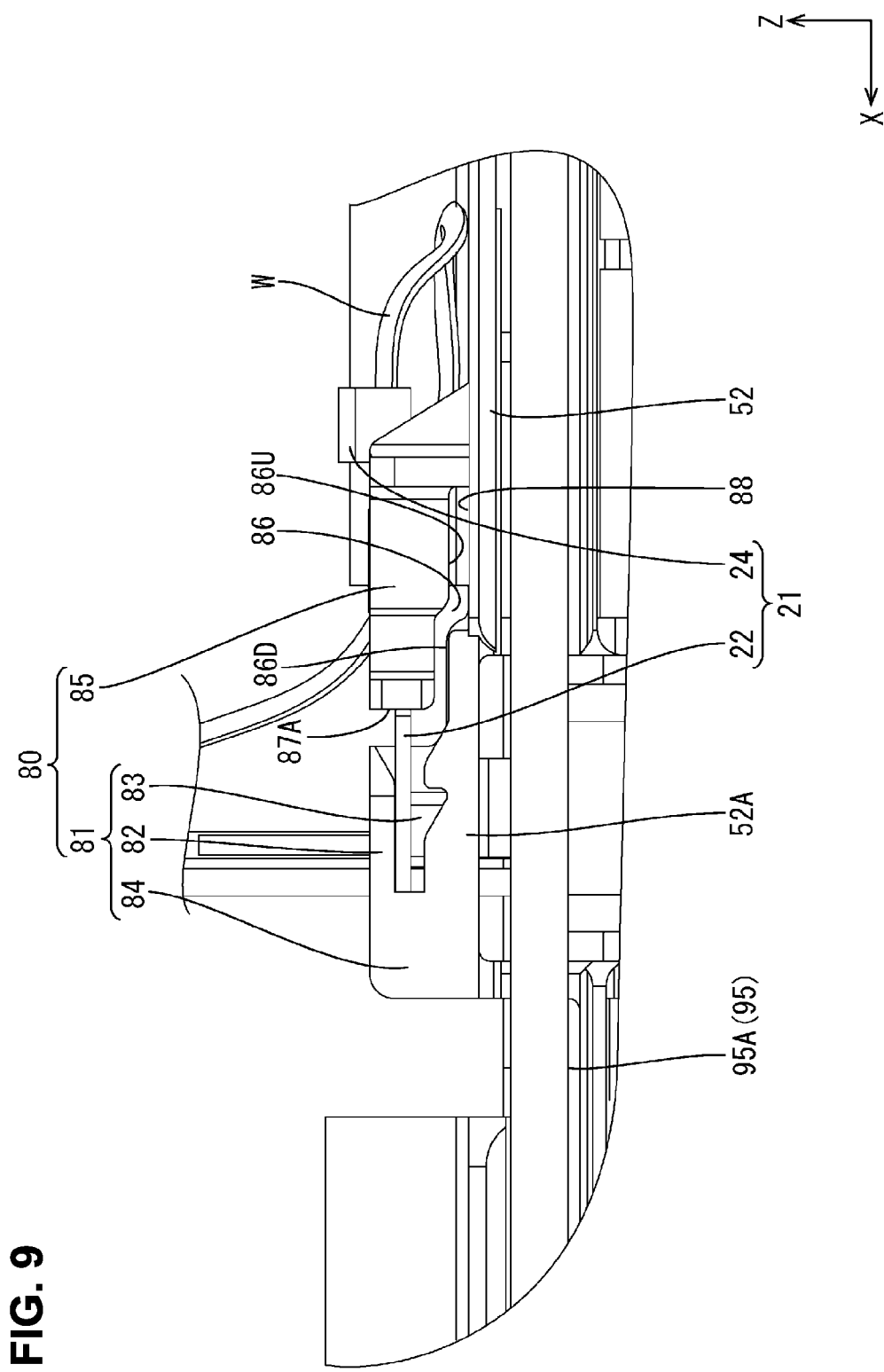
FIG. 9 is a rear view of a terminal holding part.

The elastic retaining piece 85 is formed in the busbar installation wall 52 on the left of the terminal accommodating part 81, so as to be capable of elastic displacement. As illustrated in FIG. 9, the elastic retaining piece 85 is formed in a cantilever shape, extending from the left of the terminal accommodating part 81 toward the right holding wall 84 of the terminal accommodating part 81, as a result of a slit 86 being formed between the elastic retaining piece 85 and the busbar installation wall 52.

The elastic retaining piece 85 extends from the busbar installation wall 52, which is offset lower than the lower holding wall 52A, to a position which is slightly on the left of the terminal accommodating part 81 and which overlaps with the lower holding wall 52A in the up-down direction.

As illustrated in FIG. 7 and FIG. 8, a lower end of the elastic retaining piece 85 is formed along the busbar installation wall 52. Accordingly, the slit 86 between the elastic retaining piece 85 and the busbar installation wall 52 is curved such that a left-side end and a right-side end are shifted in the up-down direction so as to follow the busbar installation wall 52. The amount of shift between the left-side end and the right-side end of the slit 86 in the up-down direction is set to be the same as the dimension of the openings of the slit 86 in the up-down direction. In other words, an upper-side inner surface 86U on the left-side end of the slit 86 and a lower-side inner surface 86D on the right-side end of the slit 86 are disposed at substantially the same height position.

As illustrated in FIG. 5 and FIG. 6, the elastic retaining piece 85 has a curved part 87 disposed along the voltage sensing terminal 21.

The curved part 87 is curved to the rear at the right-side end of the elastic retaining piece 85. When the busbar connection part 22 is accommodated in the terminal accommodating part 81, the curved part 87 is disposed at a boundary area between the wire connection part 24 and the busbar connection part 22.

Accordingly, when the voltage sensing terminal 21 is assembled with the terminal holding part 80, the voltage sensing terminal 21 is guided into the terminal accommodating part 81 by the curved part 87 of the elastic retaining piece 85. This makes it possible to improve the ease of assembly when assembling the voltage sensing terminal 21 with the terminal holding part 80.

Additionally, as illustrated in FIG. 5 and FIG. 6, a right-side end 87A of the curved part 87 of the elastic retaining piece 85, the front holding wall 83, and the right holding wall 84 are disposed at the positions of apexes of a triangle which surrounds the busbar connection part 22. A distance between the elastic retaining piece 85 and the right holding wall 84, and a distance between the elastic retaining piece 85 and the front holding wall 83, are smaller than the dimension of the outer diameter of the busbar connection part 22.

Accordingly, in a state where the busbar connection part 22 is accommodated within the terminal accommodating part 81, an outer circumferential surface (outside surface) 22A of the busbar connection part 22 is stopped and held within the terminal accommodating part 81 by making contact with the elastic retaining piece 85, the front holding wall 83, and the right holding wall 84. Additionally, when the busbar connection part 22 is held within the terminal accommodating part 81, the curved part 87 of the elastic retaining piece 85 is disposed along the boundary area between the busbar connection part 22 and the wire connection part 24 in the voltage sensing terminal 21, and the left-side end of the elastic retaining piece 85 is disposed along the wire connection part 24.

An example of a connection process for connecting the power storage module 10 to the external device will be described next.

Before the power storage module 10 and the external device are connected, the voltage sensing terminal 21 is held by the terminal holding part 80, as illustrated in FIG. 3 to FIG. 6. In other words, the terminal holding part 80 removably holds the voltage sensing terminal 21 in a state before the voltage sensing terminal 21 is connected to the terminal connection part 48 of the external connection busbars 40.

In the connection process for the power storage module 10 and the external device, the voltage sensing terminal 21 is pulled out to the left from the terminal accommodating part 81 of the terminal holding part 80, and the voltage sensing terminal 21 is removed from the terminal holding part 80.

Here, when the voltage sensing terminal 21 is pulled to the left, the outer circumferential surface of the busbar connection part 22 presses the curved part 87 of the elastic retaining piece 85. When this happens, the elastic retaining piece 85 elastically displaces to the rear, and the busbar connection part 22 is removed from the terminal accommodating part 81. In other words, the elastic retaining piece 85 elastically displaces, and thus the busbar connection part 22 can be removed from the terminal accommodating part 81 with ease.

Additionally, if, when the busbar connection part 22 is removed from the terminal accommodating part 81, the busbar connection part 22 is disposed on the busbar installation wall 52 side within the terminal accommodating part 81, there is a concern that the busbar connection part 22 will enter into the slit 86 provided below the elastic retaining piece 85 and make it difficult for the busbar connection part 22 to be removed.

However, according to the present embodiment, the slit 86 is curved in the up-down direction, and thus situations where the busbar connection part 22 enters into the slit 86 can be suppressed.

Figure 10:
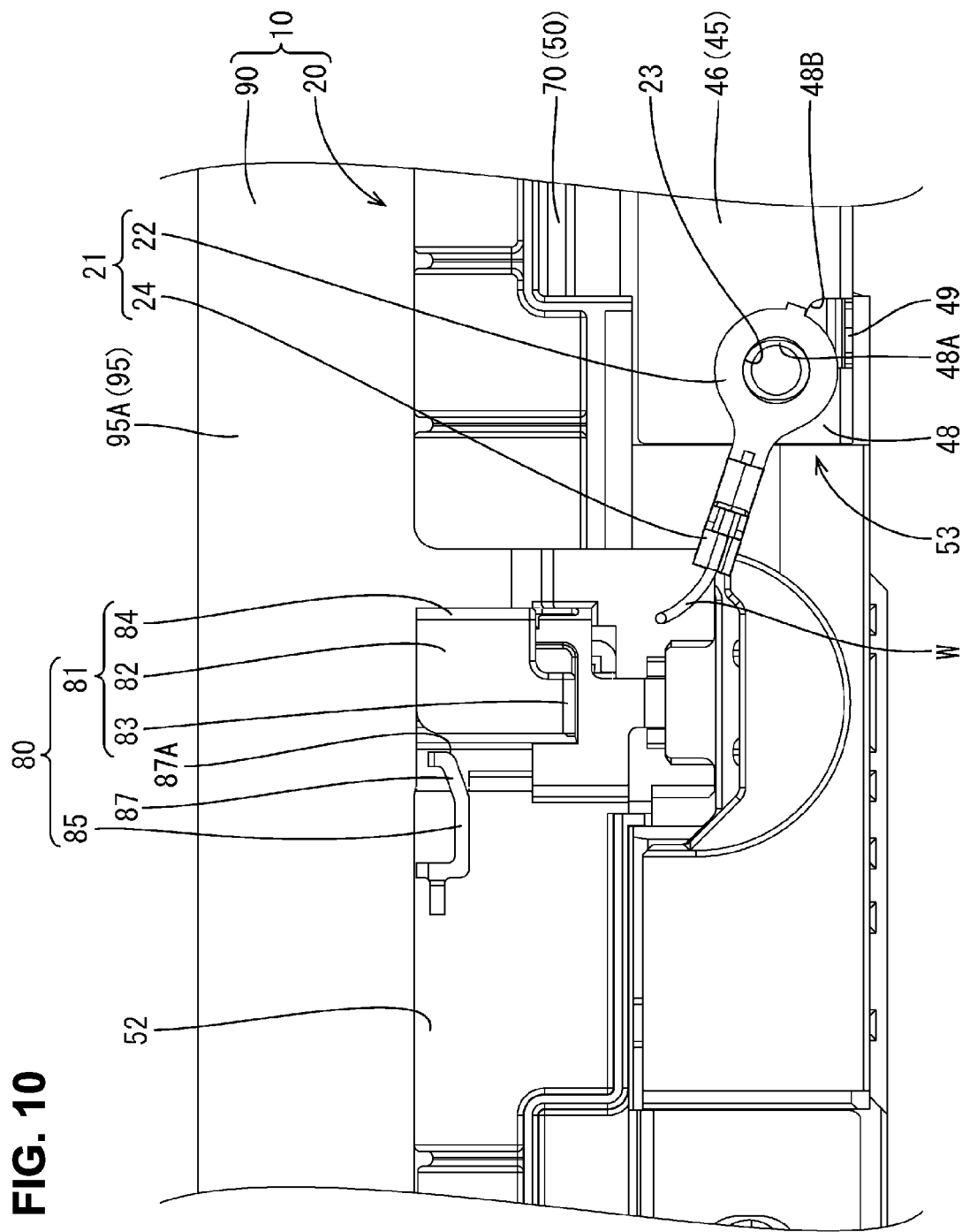
FIG. 10 is an enlarged plan view of primary elements, illustrating a state in which the voltage sensing terminal is assembled with a terminal connection part.

Next, as illustrated in FIG. 10, the voltage sensing terminal 21 which has been removed from the terminal holding part 80 is placed on the terminal connection part 48 disposed on the right-diagonal front of the terminal holding part 80, and the through-hole 23 of the voltage sensing terminal 21 is aligned with the bolt insertion hole 48A of the terminal connection part 48.

Here, when assembling the voltage sensing terminal 21 with the terminal connection part 48, the voltage sensing terminal 21 may be disposed on the terminal connection part 48 so as to slide from the left-diagonal rear to the right-diagonal front. In such a case, there is a concern that the voltage sensing terminal 21 will slide and fall off from the terminal connection part 48.

However, according to the present embodiment, the front stop part 49 is formed in the front edge of the terminal connection part, and thus as illustrated in FIG. 12, the voltage sensing terminal 21 makes contact with the front stop part 49, which makes it possible to prevent the voltage sensing terminal 21 from falling off the terminal connection part 48.

Next, the fastening bolt BT is inserted into the through-hole 23 and the bolt insertion hole 48A, and is tightened into the nut. Accordingly, as illustrated in FIG. 11, the busbar connection part 22 of the voltage sensing terminal 21 makes surface contact with the terminal connection part 48, and the voltage sensing terminal 21 is electrically connected to the terminal connection part 48. In other words, FIG. 11 illustrates a state in which the voltage sensing terminal 21 is removed from the terminal holding part 80 and connected to the terminal connection part 48.

When the voltage sensing terminal 21 is connected to the terminal connection part 48, the negative electrode-side device-side terminal of the external device is disposed on the negative electrode member connection part 46, and the device-side terminal is bolted to the negative electrode member connection part 46 by the fastening bolt BT. Likewise, the positive electrode-side device-side terminal of the external device is disposed on the positive electrode member connection part 42, and the device-side terminal is bolted to the positive electrode member connection part 42 by the fastening bolt BT.

In other words, the terminal connection part 48 and the voltage sensing terminal 21 can be connected when the device-side terminal of the external device is connected to the negative electrode member connection part 46. As such, the voltage sensing terminal 21 can be connected to the terminal connection part 48 with ease, and the ease of connection of the external device and the power storage module 10 can be improved, compared to a case where, for example, the terminal connection part and the terminal holding part are provided in different wall parts.

Actions and effects of the connection module according to the present embodiment will be described next.

For example, in a connection module that is attached to a power storage element group, if a voltage sensing terminal is connected to a busbar when the connection module is connected to an external device, the voltage sensing terminal can move freely while attached to a leading end of a voltage sensing line until the connection module is attached to the power storage element group. There is thus a concern that the voltage sensing terminal will interfere with other members or the like.

In order to solve the foregoing problem, the inventors conducted a thorough investigation, which resulted in the configuration described in the present embodiment. In other words, the present embodiment is the connection module 20, which is attached to the power storage element group 90 in which the plurality of power storage elements 91, each having the electrode terminal 93, are arranged. The connection module 20 includes the external connection busbars (connection member) 40, the insulation protector 50, the voltage sensing lines (wires) W, and the voltage sensing terminal (terminal) 21. The external connection busbars 40 are connected to the electrode terminals 93, and the insulation protector 50 is assembled with the power storage element group 90 in a state in which the external connection busbars 40 and the voltage sensing lines W are accommodated therein. The voltage sensing terminal 21 is capable of being connected to the external connection busbars 40 in a state in which the voltage sensing terminal 21 is connected to an end of the voltage sensing line W. As illustrated in FIG. 3 to FIG. 6, the insulation protector 50 includes the terminal holding part 80, and the terminal holding part 80 removably holds the voltage sensing terminal 21 in a state before the voltage sensing terminal 21 is connected to the external connection busbars 40.

The voltage sensing terminal 21 can be held by the terminal holding part 80 until being connected to the terminal connection part 48 of the negative electrode connection busbar 45, and thus the voltage sensing terminal 21 can be prevented from interfering with other members and the like.

The power storage element group 90 includes electrode disposition surfaces 92 on which the electrode terminals 93 are disposed and battery side walls 95A disposed intersecting orthogonally with the electrode disposition surfaces 92. The busbar 30 includes a negative electrode member connection part (member connection part) connected to an external device. The insulation protector 50 is disposed along the battery side walls 95A and includes the busbar installation wall 52 on which the negative electrode member connection part 46 is disposed. The terminal holding part 80 is formed integrally with the busbar installation wall 52, and the voltage sensing terminal 21 is connected to the terminal connection part 48 that is continuous with the negative electrode member connection part 46.

The terminal connection part 48 is continuous with the negative electrode member connection part 46, and thus the terminal connection part 48 can be connected to the voltage sensing terminal 21 in conjunction with the external device being connected to the negative electrode member connection part 46.

Additionally, the terminal connection part 48, which is continuous with the negative electrode member connection part 46, and the terminal holding part 80 are disposed on the busbar installation wall 52, and thus the voltage sensing terminal 21 can be connected to the terminal connection part 48 with ease, as compared to a case where, for example, the terminal connection part and the terminal holding part are provided in different wall parts. Furthermore, the terminal holding part 80 and the busbar installation wall 52 are formed integrally, and thus an increase in the number of components in the connection module 20 can be suppressed as compared to a case where a separate holding part is attached to the busbar installation wall.

The voltage sensing terminal 21 includes the busbar connection part 22 that makes surface contact with the busbar 30. The terminal holding part 80 includes the front holding wall 83 and the right holding wall 84, as well as the elastic retaining piece 85. The front holding wall 83 and the right holding wall 84 are provided protruding toward the busbar installation wall 52. The elastic retaining piece 85 is provided in the busbar installation wall 52 so as to be capable of elastic displacement. The front holding wall 83, the right holding wall 84, and the elastic retaining piece 85 make contact with the outer circumferential surface (outside surface) of the busbar connection part 22 and retain the voltage sensing terminal 21 in the terminal holding part 80.

The front holding wall 83, the right holding wall 84, and the elastic retaining piece 85 make contact with the outer circumferential surface of the busbar connection part 22 and hold the voltage sensing terminal 21 in the terminal holding part 80, and thus the part of the busbar connection part 22 that makes surface contact with the busbar 30 can be prevented from making contact with and damaging the front holding wall 83, the right holding wall 84, and the elastic retaining piece 85. Additionally, the elastic retaining piece 85 elastically displaces when the voltage sensing terminal 21 is attached to and removed from the terminal holding part 80, which provides excellent ease of attachment and removal.

The terminal holding part 80 includes the protective wall 82 that covers the voltage sensing terminal 21. The voltage sensing terminal 21 is held by the terminal holding part 80 while being covered by the protective wall 82, which makes it possible to prevent other members from coming into contact or the like with the voltage sensing terminal 21 and damaging the voltage sensing terminal 21.

The elastic retaining piece 85 is capable of elastic displacement by the slit 86 being formed between the busbar installation wall 52 and the elastic retaining piece 85, and the slit 86 is curved in the plate thickness direction of the busbar connection part 22.

When the elastic retaining piece 85 is capable of elastic displacement by providing the slit 86 between the busbar installation wall 52 and the elastic retaining piece 85, when the voltage sensing terminal 21 is attached to and removed from the terminal holding part 80, there is a concern that the busbar connection part 22 may enter into the slit 86 and the voltage sensing terminal 21 will be "bitten". However, according to the present embodiment, the slit 86 is curved in the plate thickness direction of the busbar connection part 22, and thus situations where the busbar connection part 22 enters into the slit 86 can be suppressed.

Additionally, the elastic retaining piece 85 is curved along the voltage sensing terminal 21, and thus when the voltage sensing terminal 21 is assembled with the terminal holding part 80, the voltage sensing terminal 21 is guided by the curved elastic retaining piece 85. This makes it possible to improve the ease of assembly when assembling the voltage sensing terminal 21 with the terminal holding part 80.

The voltage sensing terminal 21 includes the wire connection part 24 that is crimped to the voltage sensing line. The wire connection part 24 protrudes in the plate thickness direction further than the busbar connection part 22. The busbar installation wall 52 includes the escape part 88. The escape part 88 is offset further downward (the opposite direction from the wire connection part) by an amount greater than a dimension at which the wire connection part 24 protrudes from the busbar connection part 22, with a position where the busbar connection part 22 is disposed as a reference position.

When the voltage sensing terminal 21 is attached to the terminal holding part 80 in a state in which the wire connection part 24 protrudes toward the busbar installation wall 52, the wire connection part 24 is contained within the escape part 88, which is offset downward. This makes it possible to prevent interference between the voltage sensing terminal 21 and the busbar installation wall 52. In other words, the voltage sensing terminal 21 can be attached to the terminal holding part 80 without needing to be aware of the front and back of the voltage sensing terminal 21, which makes it possible to improve the ease of attachment of the voltage sensing terminal 21.

Second Embodiment

A second embodiment will be described next with reference to FIG. 12 to FIG. 17.

A power storage module 110 of the second embodiment changes the shape of the terminal holding part 80 of the connection module 20 in the first embodiment. Configurations, actions, and effects that are the same as in the first embodiment are therefore redundant and will not be described here. Furthermore, the same reference signs will be used for configurations which are the same as in the first embodiment.

Figure 13:
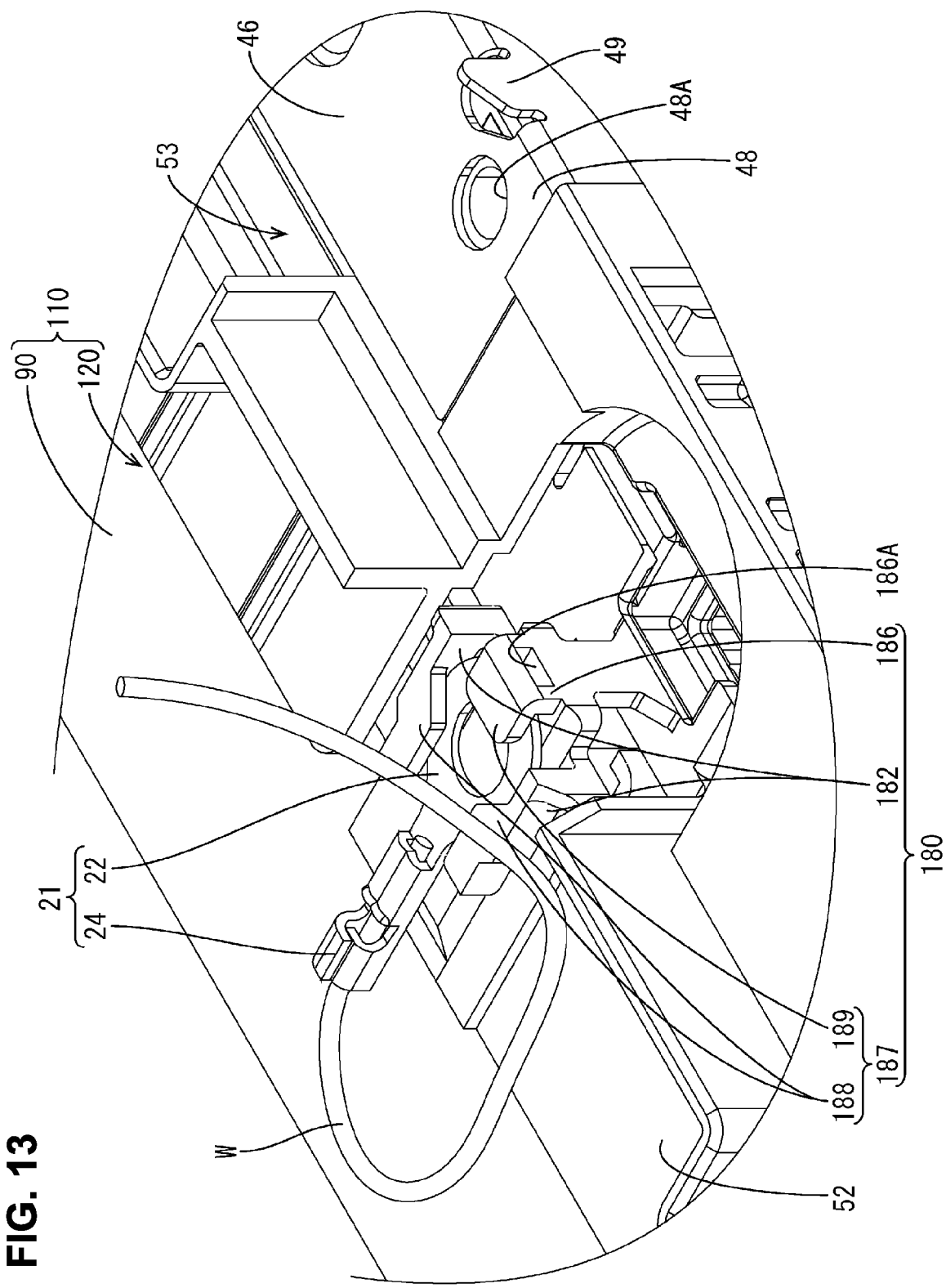
FIG. 13 is an enlarged perspective view of primary elements of a power storage module according to a second embodiment.
Figure 14:
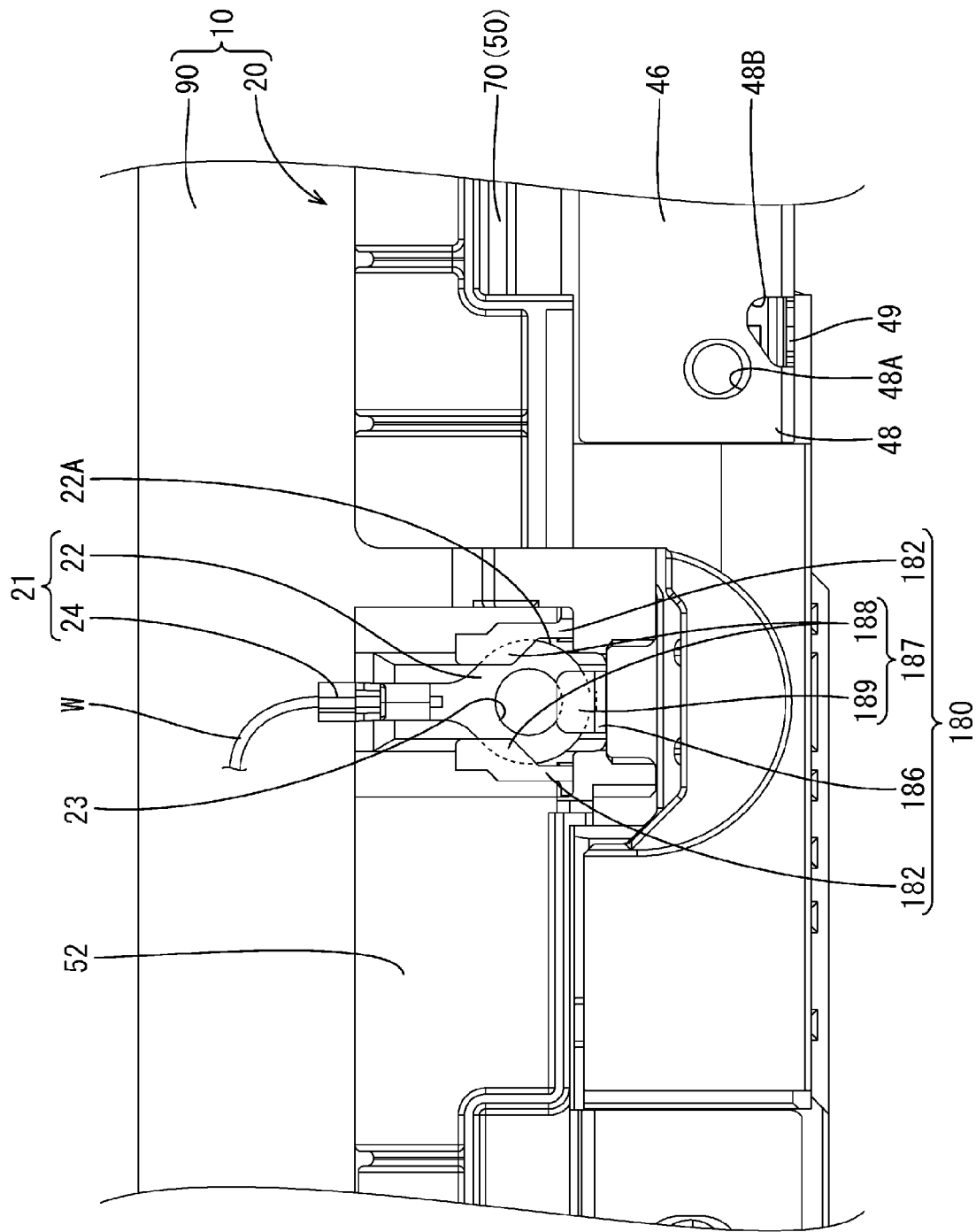
FIG. 14 is an enlarged plan view illustrating primary elements of the power storage module.
Figure 15:
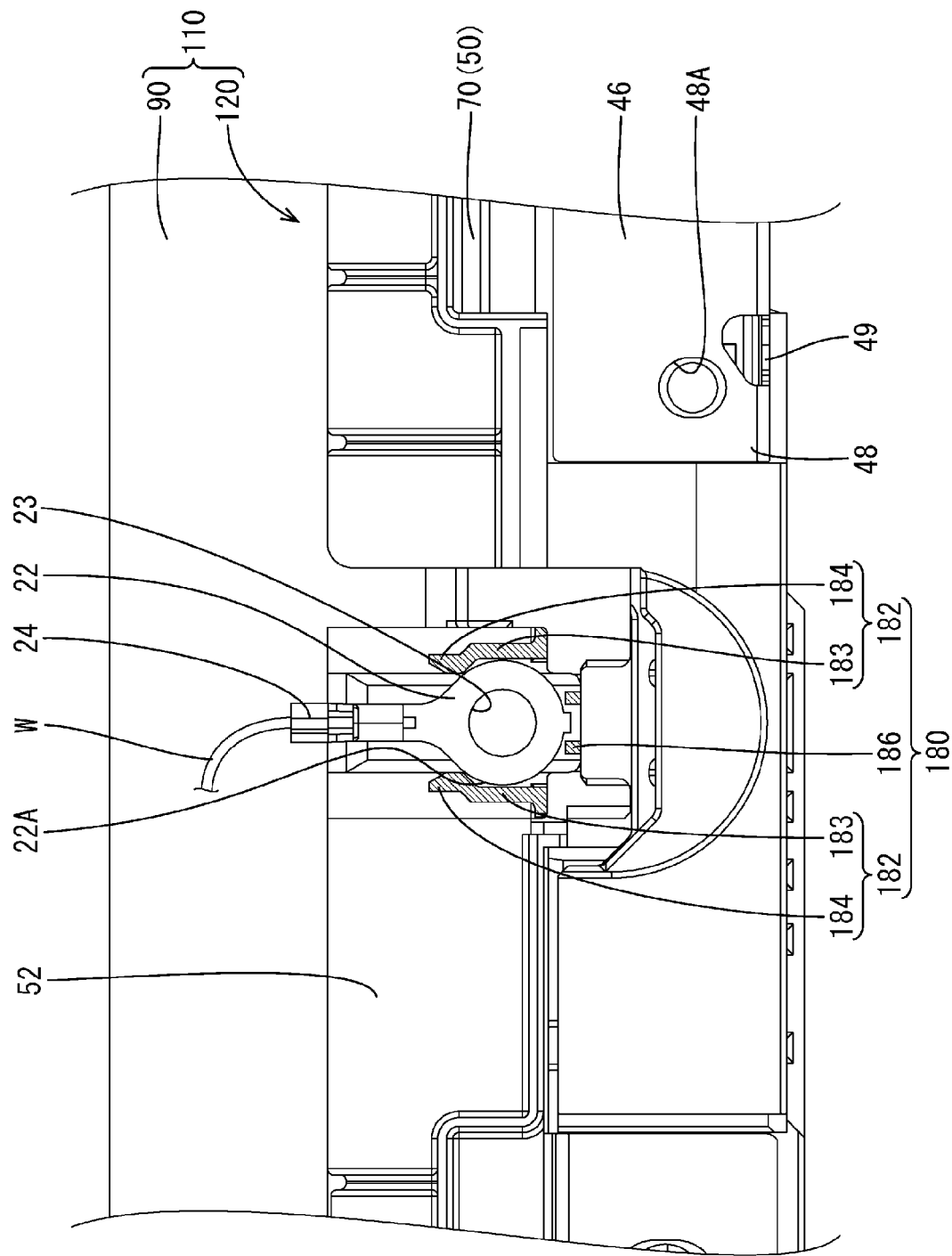
FIG. 15 is a cross-sectional view of a holding part, and is a cross-sectional view corresponding to the cross-section in FIG. 6.
Figure 16:
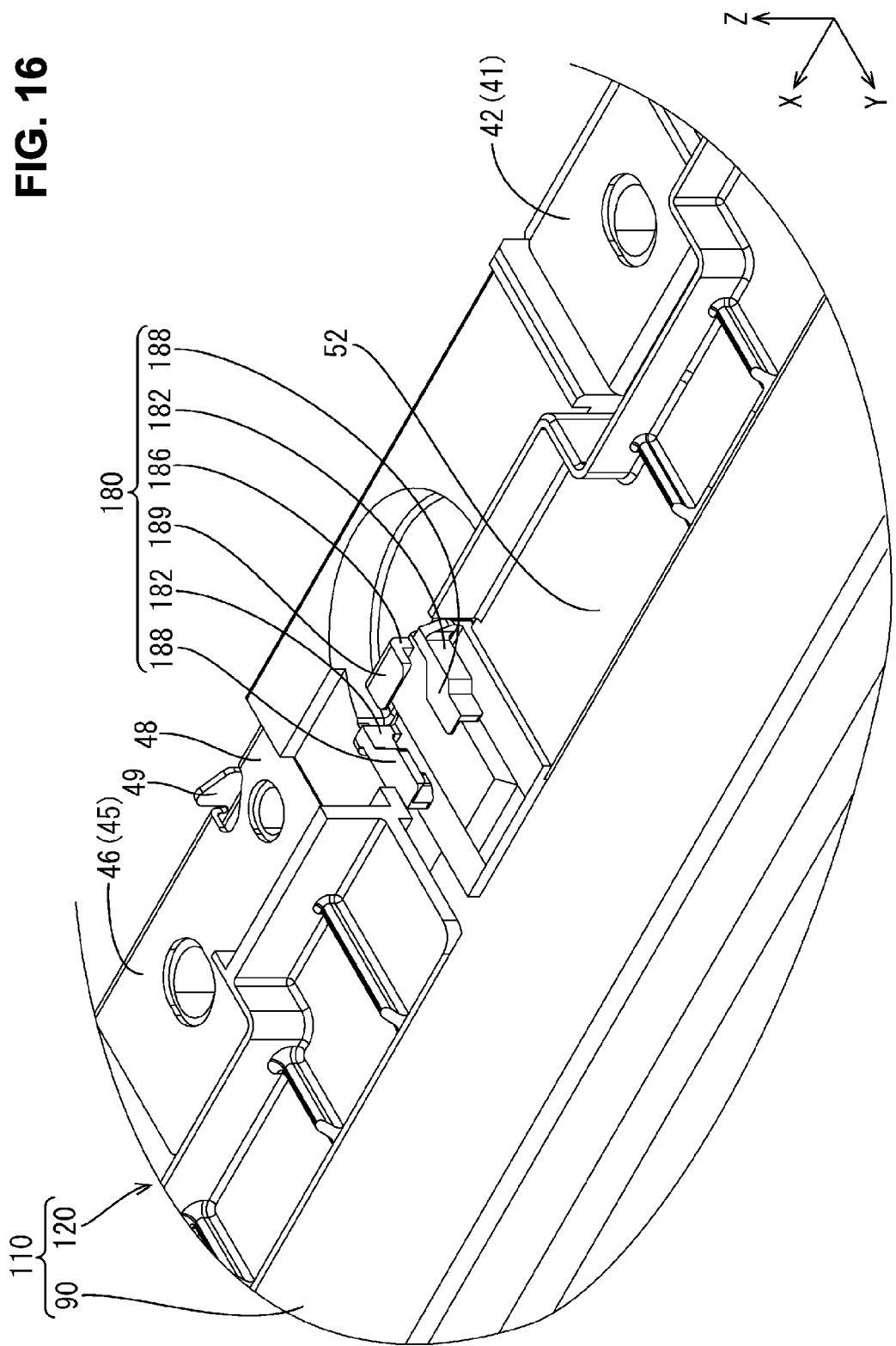
FIG. 16 is a perspective view of the holding part viewed from behind at an angle.

As illustrated in FIG. 13 to FIG. 15, a terminal holding part 180 of a connection module 120 of the second embodiment has the voltage sensing terminal 21 assembled from the rear.

Terminal Holding Part 180

As illustrated in FIG. 13 to FIG. 15, the terminal holding part 180 includes a pair of elastic retaining pieces 182 disposed facing each other in the left-right direction, a front holding wall 186 disposed slightly to the front of the pair of elastic retaining pieces 182, and a protective wall 187.

Figure 17:
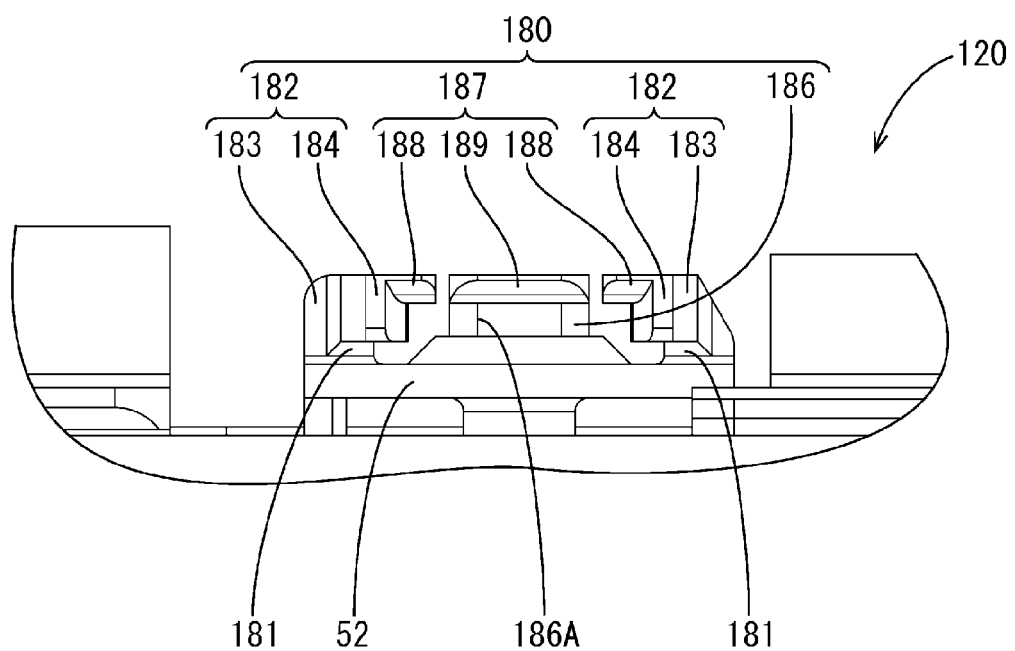
FIG. 17 is a rear view of the holding part.

As illustrated in FIG. 17, the pair of elastic retaining pieces 182 are formed extending rearward in a cantilever shape by having a slit 181 formed between each of the pieces and the busbar installation wall 52.

As illustrated in FIG. 13 to FIG. 16, each elastic retaining piece 182 includes a main body part 183 extending rearward in a straight line from a position continuous with the busbar installation wall 52, and an engagement part 184 provided at a rear end of the main body part 183.

As illustrated in FIG. 14 and FIG. 15, a distance between the main body parts 183 of the pair of elastic retaining pieces 182 is set to be slightly greater than the outer diameter dimension of the busbar connection part 22. The engagement parts 184 of the pair of elastic retaining pieces 182 are disposed so as to be closer to each other than the main body parts 183. Accordingly, a distance between the two engagement parts 184 is smaller than the outer diameter dimension of the busbar connection part 22 and greater than the wire connection part 24.

The front holding wall 186 is formed extending upward from the busbar installation wall 52. A rectangular hole 186A that penetrates in the front-back direction is formed in a central position of the front holding wall 186 in the left-right direction. The front holding wall 186 is disposed in front of the pair of elastic retaining pieces 182, in a position that is the same distance from the pair of elastic retaining pieces 182. In other words, in the terminal holding part 180, the pair of elastic retaining pieces 182 and the front holding wall 186 are disposed at the positions of apexes of a triangle, as illustrated in FIG. 14 and FIG. 15.

The busbar connection part 22 of the voltage sensing terminal 21 can be disposed between the pair of elastic retaining pieces 182 and the front holding wall 186. In other words, when the voltage sensing terminal 21 is assembled with the terminal holding part 180 from the rear and the busbar connection part 22 is disposed between the pair of elastic retaining pieces 182 and the front holding wall 186, the busbar connection part 22 is surrounded by the pair of elastic retaining pieces 182 and the front holding wall 186 from three sides.

As illustrated in FIG. 13 to FIG. 17, the protective wall 187 is constituted by side protective walls 188 provided on an upper edge of the pair of elastic retaining pieces 182, and a front protective wall 189 provided on the front holding wall 186.

The side protective walls 188 in the pair of elastic retaining pieces 182 are formed projecting toward each other at positions from central parts of the main body parts 183 in the elastic retaining pieces 182 in the front-back direction to rear ends of the engagement parts 184. The dimensions by which the side protective walls 188 project from the elastic retaining pieces 182 are set to be slightly smaller than a dimension between an outer circumferential surface 22A of the busbar connection part 22 and the through-hole 23 in the radial direction.

The front protective wall 189 is formed extending rearward from the front holding wall 186. The dimension by which the front protective wall 189 projects from the front holding wall 186 is set to be slightly greater than a dimension between the outer circumferential surface 22A of the busbar connection part 22 and the through-hole 23 in the radial direction.

Accordingly, when the voltage sensing terminal 21 is assembled with the terminal holding part 180 from the rear and the busbar connection part 22 is disposed between the pair of elastic retaining pieces 182 and the front holding wall 186, the front protective wall 189 and the two side protective walls 188 cover part of the busbar connection part 22 from above.

In other words, the terminal holding part 180 is capable of holding the voltage sensing terminal 21 in a retained state by the outer circumferential surface of the busbar connection part 22 making contact with the pair of elastic retaining pieces 182 and the front holding wall 186, and the protective wall 187 making contact with the upper surface of the busbar connection part 22.

When removing the voltage sensing terminal 21 from the terminal holding part 180, the voltage sensing terminal 21 is removed from the terminal holding part 180 by pulling the voltage sensing terminal 21 rearward so that the engagement parts 184 of the pair of elastic retaining pieces 182 separate from each other and the pair of elastic retaining pieces 182 elastically displace.

According to the present embodiment as described thus far as well, the voltage sensing terminal 21 can be held by the terminal holding part 180 until being connected to the terminal connection part 48, and thus the voltage sensing terminal 21 can be prevented from interfering with other members and the like.

OTHER EMBODIMENTS

The technique disclosed in the present specification is not limited to the embodiments described in the foregoing descriptions and the drawings, and also includes other various forms, such as the following, for example.

(1) In the foregoing embodiments, the voltage sensing terminal 21 is assembled with the terminal holding part 80 from the left, and the voltage sensing terminal 21 is assembled with the terminal holding part 180 from the rear. However, the configuration is not limited thereto, and the voltage sensing terminal may be assembled with the terminal holding part from the front, the right, the diagonal-front, the diagonal-rear, or the like.

(2) In the foregoing embodiments, the voltage sensing terminal 21 is retained by the elastic retaining piece 85, the right holding wall 84, and the front holding wall 83 in the terminal holding part 80 making contact with the outer circumferential surface of the busbar connection part 22, and the voltage sensing terminal 21 is retained by the pair of elastic retaining pieces 182 and the front holding wall 186 in the terminal holding part 180 making contact with the outer circumferential surface of the busbar connection part 22. However, the configuration is not limited thereto, and the voltage sensing terminal may be held by sandwiching the busbar connection part in the terminal holding part in the plate thickness direction.

(3) In the foregoing embodiments, the end busbars 35 and the external connection busbars 40 are connected through welding. However, the configuration is not limited thereto, and the end busbars and the external connection busbars may be configured by a single busbar serving as a connection member.

(4) In the foregoing embodiments, the insulation protector 50 is configured by assembling the first protector 60 with the second protector 70. However, the configuration is not limited thereto, and the insulation protector may be configured by a single member.

(5) In the foregoing embodiments, the terminal holding part 80 is provided in the busbar installation wall 52 constituted by the first protector 60. However, the configuration is not limited thereto, and the terminal holding part may be provided in the second protector.

REFERENCE SIGNS LIST

10: Power storage module
20: Connection module
21: Voltage sensing terminal ("terminal")
22: Busbar connection part
22A: Outer circumferential surface (outside surface)
23: Through-hole
24: Wire connection part
24A: Bottom plate
24B: Barrel piece
30: Busbar
35: End busbar
40 External connection busbar ("connection member")
41: Positive electrode connection busbar
42: Positive electrode member connection part
43: Bolt insertion hole
45: Negative electrode connection busbar
46: Negative electrode member connection part ("member connection part")
47: Bolt insertion hole
48: Terminal connection part
48A: Bolt insertion hole
48B: Notch
49: Front stop part
50: Insulation protector
52: Busbar installation wall
52A: Lower holding wall
53: Negative electrode busbar holding part
54: Positive electrode busbar holding part
60: First protector
61: Main protector body
63: Routing channel
64: Partition wall
65: Busbar holding part
66: Branch line channel
70: Second protector
72: First busbar holding part
73: Engagement claw
74: Second busbar holding part
75: Engagement piece
80: Terminal holding part
81: Terminal accommodating part
82: Protective wall
83: Front holding wall
84: Right holding wall
85: Elastic retaining piece
86: Slit
86D: Lower-side inner surface
86U: Upper-side inner surface
87: Curved part
87A: Right-side end
88: Escape part
90: Power storage element group
91: Power storage element
92: Electrode disposition surface
93: Electrode terminal
93N: Negative terminal
93P: Positive terminal
95: Frame
95A: Battery side wall
96: Engaged part
110: Power storage module
120: Connection module
180: Terminal holding part
181: Slit
182: Elastic retaining piece
183: Main body part
184: Engagement part
186: Front holding wall
186A: Rectangular hole
187: Protective wall
188: Side protective wall

189: Front protective wall
BT: Fastening bolt
W: Voltage sensing line (an example of a "wire")

The invention claimed is:

1. A connection module that is attached to a power storage element group in which a plurality of power storage elements, each having an electrode terminal, are arranged, the connection module comprising:
a connection member, an insulation protector, a wire, and a terminal,
wherein the connection member is connected to the electrode terminals,
the insulation protector is assembled with the power storage element group in a state in which the connection member and the wire are accommodated in the insulation protector,
the terminal is configured to be connected to the connection member in a state in which the terminal is connected to an end of the wire,
the insulation protector includes a terminal holding part configured to cover at least a distal end portion of the terminal in a plan view, and
the terminal holding part removably holds the terminal in a state before the terminal is connected to the connection member,
the power storage element group includes an electrode disposition surface on which the electrode terminals are disposed and a battery side wall disposed intersecting with the electrode disposition surface,
the connection member includes a member connection part connected to an external device,
the insulation protector is disposed along the battery side wall and includes a busbar installation wall on which the member connection part is disposed,
the terminal holding part is formed integrally with the busbar installation wall,
the terminal is connected to a terminal connection part that is continuous with the member connection part,
the terminal includes a busbar connection part that makes surface contact with the connection member,
the terminal holding part includes a holding wall and an elastic retaining piece,
the holding wall protrudes toward the busbar installation wall,
the elastic retaining piece is provided in the busbar installation wall so as to be capable of elastic displacement, and
the holding wall and the elastic retaining piece make contact with an outside surface of the busbar connection part and retain the terminal in the terminal holding part.

2. The connection module according to claim 1, wherein the terminal holding part includes a protective wall that covers the terminal.

3. The connection module according to claim 1, wherein the elastic retaining piece is capable of elastic displacement by a slit being formed between the busbar installation wall and the elastic retaining piece, and the slit is curved in a plate thickness direction of the busbar connection part.

4. The connection module according to claim 1, wherein the elastic retaining piece is curved along the terminal.

5. The connection module according to claim 1, wherein the terminal includes a wire connection part that is crimped to the wire,
the wire connection part protrudes in the plate thickness direction further than the busbar connection part,
the busbar installation wall includes an escape part, and
the escape part is offset in the opposite direction from the wire connection part by an amount greater than a dimension at which the wire connection part protrudes from the busbar connection part, with a position where the busbar connection part is disposed as a reference position.

* * * * *